United States Patent [19]
Jaszlics et al.

[11] Patent Number: 6,166,744
[45] Date of Patent: Dec. 26, 2000

[54] SYSTEM FOR COMBINING VIRTUAL IMAGES WITH REAL-WORLD SCENES

[75] Inventors: Ivan J. Jaszlics; Sheila L. Jaszlics, both of Golden, Colo.

[73] Assignee: Pathfinder Systems, Inc., Lakewood, Colo.

[21] Appl. No.: 09/153,503

[22] Filed: Sep. 15, 1998

Related U.S. Application Data

[60] Provisional application No. 60/066,904, Nov. 26, 1997.

[51] Int. Cl.⁷ .................................................. G06T 17/00
[52] U.S. Cl. ............................................ 345/435; 345/421
[58] Field of Search .................................... 345/435, 421, 345/11; 434/11

[56] References Cited

U.S. PATENT DOCUMENTS

| | | |
|---|---|---|
| 4,970,666 | 11/1990 | Welsh et al. ............................. 364/522 |
| 5,130,794 | 7/1992 | Ritchey . |
| 5,214,615 | 5/1993 | Bauer . |
| 5,347,400 | 9/1994 | Hunter . |
| 5,355,325 | 10/1994 | Uhlmann . |
| 5,412,619 | 5/1995 | Bauer . |
| 5,436,638 | 7/1995 | Bolas et al. . |
| 5,479,597 | 12/1995 | Fellous .................................... 395/154 |
| 5,488,508 | 1/1996 | Haseltine . |
| 5,502,747 | 3/1996 | McGrath . |
| 5,510,832 | 4/1996 | Garcia . |
| 5,544,249 | 8/1996 | Opitz . |
| 5,563,988 | 10/1996 | Maes et al. . |
| 5,566,370 | 10/1996 | Young ........................................ 348/36 |
| 5,616,030 | 4/1997 | Watson ...................................... 434/38 |
| 5,625,765 | 4/1997 | Ellenby et al. .......................... 395/135 |
| 5,684,943 | 11/1997 | Abraham et al. ....................... 395/173 |
| 5,737,533 | 4/1998 | de Hond ............................. 395/200.49 |
| 5,781,198 | 7/1998 | Korn ........................................ 345/435 |
| 5,854,857 | 12/1998 | de Queiroz et al. ................... 382/232 |

*Primary Examiner*—Mark K. Zimmerman
*Assistant Examiner*—Mano Padmanabhan
*Attorney, Agent, or Firm*—Dorr, Carson, Sloan & Birney, P.C.

[57] ABSTRACT

A system for combining virtual images with images of the real world. A range scanner determines the shape and distance of real-world objects within a field of interest to the observer using the apparatus. Virtual masking objects, which are simplified computer models of real-world objects, are derived from the range data. Virtual entities that are not present in the real world are simulated in an electronic computer. Images of the virtual entities and the virtual masking objects are combined into masked virtual images. The masked virtual images show the portions of virtual entities that would be visible if these entities actually existed in the real world. The masked virtual images and images of the real world scene are combined in such a manner that the virtual images appear to be obscured, when appropriate for their simulated, virtual location by real-world objects. The resulting combined image is presented in an electronic or optical display.

29 Claims, 18 Drawing Sheets

Real World Scene

Masked Virtual Image

Virtual Image

Combined Image

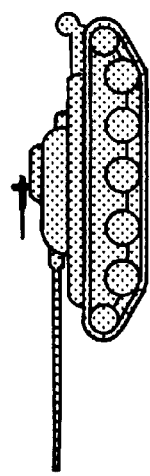
Fig. 1b
Virtual Image
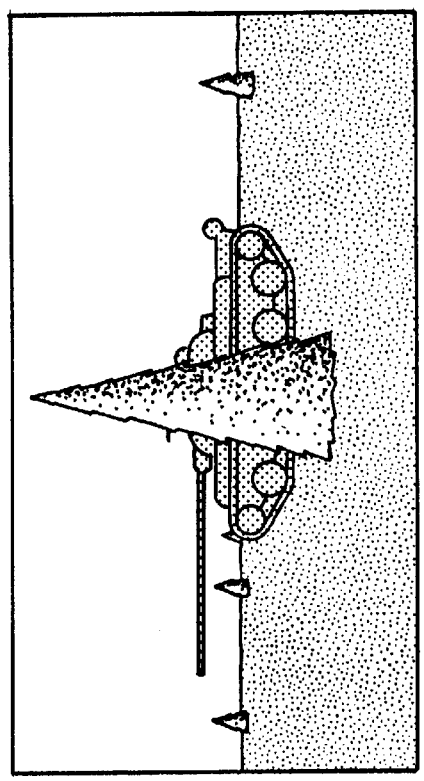
Fig. 1d
Combined Image
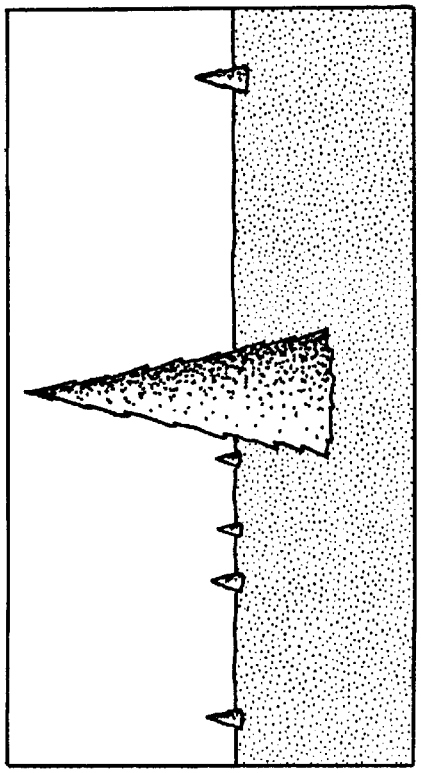
Fig. 1a
Real World Scene
Fig. 1c
Masked Virtual Image
Fig. 1

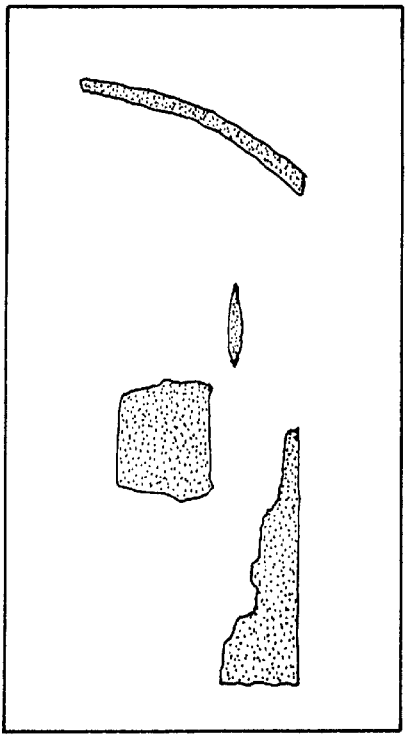
Fig. 3 Laser-generated Range Map
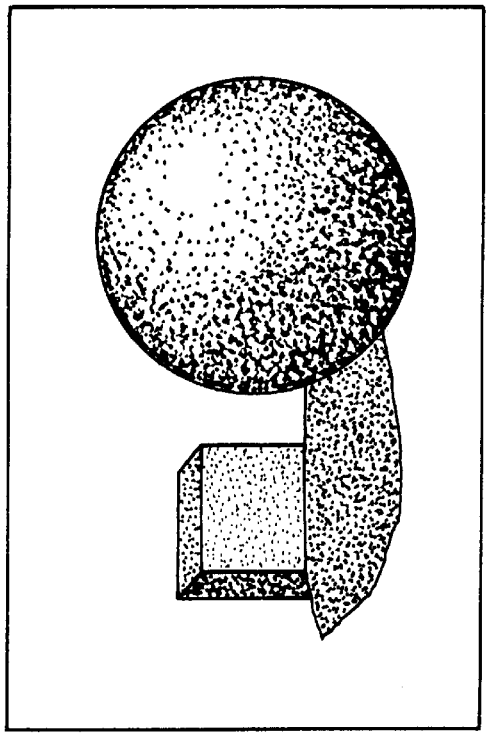
Fig. 4 Virtual Masking Objects
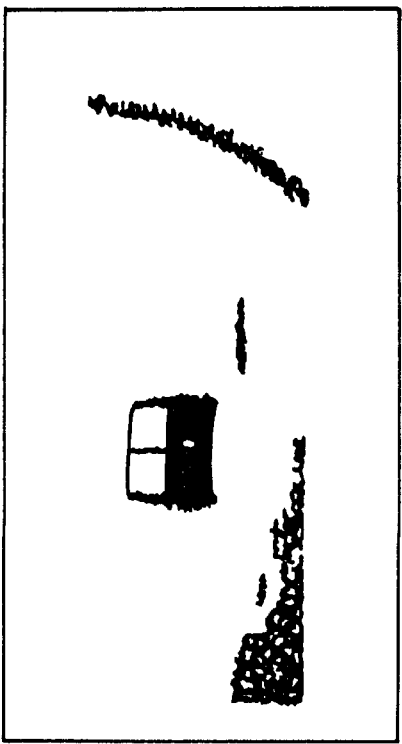
Fig. 6 Effect of virtual masking object
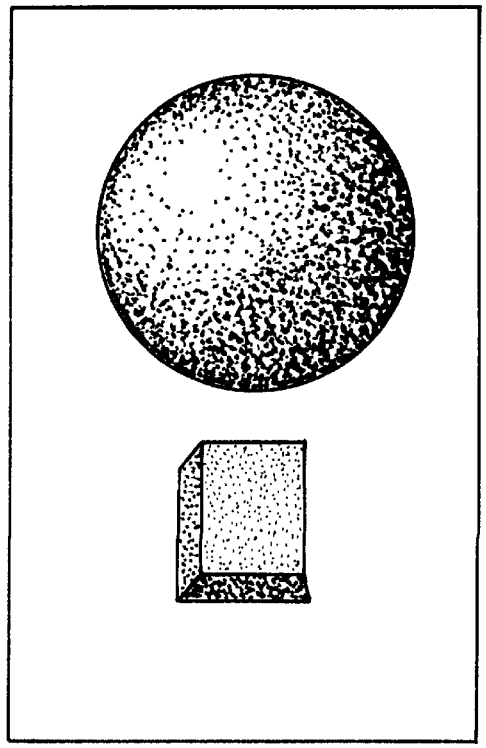
Fig. 7 Virtual masking object is shown

```
#VRML V2.0 utf8
Transform {
 children Shape {
   appearance Appearance {
     material Material {
                        ambientIntensity  0
                        diffuseColor      0 0 0
                        shininess         0
     }
   }
 geometry IndexedFaceSet { coord Coordinate { point[
        -0.0655473   1.14116    -45.9981,
        -0.235112    1.10839    -44.9971,
        -0.106866    0.980146   -44.9962,
         0.062694    0.952124   -43.9958,
         0.229877    0.952132   -43.9952,
         0.564238    0.993969   -43.9928,
         0.748038    1.02297    -44.9906,
         0.939429    1.05388    -45.9877,
         0.58991     1.1412     -45.9943,
 ] } coordIndex [ 0, 1, 2, 3, 4, 5, 6, 7, 8, 0, -1 ] }, } }
```

Virtual masking object display constructs, VRML

*Fig. 5*

$$A_n(t) = [A_n(T_1) - A_n(T_0)](t - T_1), \quad n = 1, \ldots, N$$
$$E_n(t) = [E_n(T_1) - E_n(T_0)](t - T_1), \quad n = 1, \ldots, N$$
$$r_n(t) = [r_n(T_1) - r_n(T_0)](t - T_1), \quad n = 1, \ldots, N$$

Linear extrapolation of vertex positions between range frame acquisitions.

*Fig. 8*

```
For each display row i {
  For each pixel j {
    Render_real_pixel = true;
    For each attribute k of the pixel in the virtual image {
      Transparent_background = ((background_attribute(k) == attribute(k));
      Render_real_pixel = Render_real_pixel && Transparent_background;
    }
    If (Render_real_pixel) Show the digital video pixel;
    Else Show the virtual display pixel;
  }
}
```

Pseudo-code for Digital Image Combination

*Fig. 10*

SYSTEM FOR COMBINING VIRTUAL IMAGES WITH REAL-WORLD SCENES

RELATED APPLICATION

The present application is based on the Applicant's U.S. Provisional patent application Ser. No. 60/066,904, entitled "System For Combining Virtual Images With Real-World Scenes" filed on Nov. 26, 1997.

BACKGROUND OF THE INVENTION

1. Field of the Invention

The present invention relates generally to the field of virtual reality simulation, and more particularly to systems for combining virtual images with real-world scenes.

2. Statement of the Problem

Virtual reality systems have gained wide acceptance in recent years for training and simulations in a number of fields, including aircraft simulators, virtual reality games, surgical training, military training and motion picture and video special effects. Conventional virtual reality systems generate a field of view for the user that is either completely computer-generated, or may include real-world scenery as background. Some virtual reality systems use portions of real-world images (e.g., a particular object, pattern, or texture) that can be incorporated into a computer-generated environment. However, conventional virtual reality systems do not typically incorporate virtual images into real-world scenes due to the difficulties of integrating a virtual image into a real-world scene in a realistic manner. For example, the virtual image can mask portions of the real-world scene, and objects in the real-world scene can mask portions of the virtual image depending on their relative locations and sizes.

Combining virtual images with real-world scenes will improve many current applications of virtual reality, and it will make possible new applications and systems for applying virtual reality. For example, the U.S. Army trains its armored vehicle crews using virtual reality simulators. These simulators are static and rely entirely on computer-generated images. The army also trains armored vehicle crews in war games using actual vehicles moving over real terrain. These vehicles can be fully instrumented and connected to computer systems that record and analyze the performance of the crew and vehicle throughout the exercise. The computer system can also record and indicate simulated "hits" on opposing vehicles. Although such war games are much more realistic than simulators, they are also much more expensive and time consuming due to the requirements of operating actual vehicles and managing the manpower necessary to conduct a realistic exercise. The cost of instrumentation for a large number of vehicles is also substantial. The present invention can be used in these war games to generate virtual tanks that appear to move about the terrain. This can completely eliminate the need, for example, for live tanks representing the enemy force in a war gaming exercise. Virtual vehicles and real vehicles can appear in the same scene. The present invention can also be used to generate virtual "hits" and explosions during an exercise.

The present invention also has application in the field of aircraft simulation. Virtual aircraft or virtual flying conditions can be combined with real-world scenes during an actual flight or a simulated flight. Another possible field of use is in games, such as laser tag, so that virtual players, objects, and special effects can be combined with real players and real objects in the playing field.

The present invention has application in the area of entertainment in the high-speed generation of special effects and three-dimensional displays. Special effects in the motion picture and video industries integrate real-world scenes and computer graphics, that is, virtual images. The invention permits real-time generation of special effects in video film and motion picture production. Also, there exist various three-dimensional motion picture and video systems that can replay, with the aid of special display goggles, recorded three-dimensional scenes. The present invention can be used with electronic display goggles to greatly extend this entertainment medium by injecting, in real time, three-dimensional virtual elements into the view of the real world. The method of the present invention can be also used to create virtual elements in theme parks and other entertainment-oriented environments. The virtual elements injected into real-world environments in entertainment applications may be representations of persons, animals, natural phenomena, cartoon characters, and other real or imaginary visual elements.

3. Solution to the Problem

The present system enables computer-generated virtual images to be combined with images of the real world. A range scanner determines the shape and distance of real-world objects within a field of regard of interest to the observer. Virtual masking objects, which are simplified computer models of real-world objects, are derived from the range data. A computer simulates virtual entities and combines these virtual images with the virtual masking objects to create masked virtual images. The masked virtual images show the portions of virtual entities that would be visible if the virtual entities actually existed in the real world. The masked virtual images and the real-world scene are combined and displayed in such a manner that the virtual images appear to be obscured, when appropriate for their simulated location relative to real-world objects.

SUMMARY OF THE INVENTION

This invention provides a system for combining virtual images with images of the real world. A range scanner determines the shape and distance of real-world objects within a field of regard of interest to the observer using the apparatus. Virtual masking objects, which are simplified computer models of real-world objects, are derived from the range data. Virtual entities that are not present in the real world are simulated in an electronic computer. Images of the virtual entities and the virtual masking objects are combined into masked virtual images. The masked virtual images show the portions of virtual entities that would be visible if these entities actually existed in the real world. The masked virtual images and images of the real world scene are combined in such a manner that the virtual images appear to be obscured, when appropriate for their simulated, virtual location by real-world objects. The resulting combined image is presented in an electronic or optical display.

A primary object of the present invention is to provide a system for realistically combining virtual images into real-world scenes as part of a computer simulation.

Another object of the present invention is to provide a system for combining virtual images into real-world scenes that can be incorporated into real-time simulators, such as simulators for aircraft or armored vehicles.

Another object of the present invention is to create special effects in motion picture and video production by injecting at high speed, or in real time, virtual objects into a real-world environment. Another object of the present invention is to create special effects in theme parks by injecting in real time the images of virtual objects into a real-world environment.

Another object of the present invention is to provide entertainment and game devices that permit the combination of virtual images with real-world scenes.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 1a through 1d are examples of the real-world scene, a virtual image, the resulting masked virtual image, and combined images, respectively.

FIG. 3 is an example of a range map generated by the range scanner.

FIG. 4 is an example of the virtual masking objects corresponding to the range map shown in FIG. 3.

FIG. 5 is a VRML listing of a virtual masking object display construct representing one of the grassy knolls shown in FIGS. 3 and 4.

FIG. 6 is an example of the effect of implementing the virtual masking object defined in FIG. 5 on the virtual image of a cube behind the knoll and the virtual image of a sphere in front of the knoll.

FIG. 7 is an image combining the grassy knoll, cube, and sphere.

FIG. 8 is a listing of the equations used to implement time extrapolation for the virtual masking objects between range frame updates.

FIG. 10 is a pseudo-code listing of an algorithm for digital image combination.

DETAILED DESCRIPTION OF THE INVENTION

An example of the basic functionality of the present invention is demonstrated in FIGS. 1a through 1d. The present system combines the image of a real-world scene (FIG. 1a) with a virtual image (FIG. 1b). The invention provides a method and the description of a reference apparatus and alternative implementations, to sense and remove elements of a virtual image, thereby generating a masked virtual image (FIG. 1c). The masked virtual image and the image of the real world are then combined in such a manner that in the resulting combined image (FIG. 1d) the virtual object will appear to exist and move in the real world at its virtual position. While FIGS. 1a through 1d show a battle tank, the method of the invention has been also demonstrated using many other virtual objects, including animated human figures, geometric figures, or injection of three-dimensional building plans into a real-world environment. The method is independent of the type of virtual entity generated, and it is also independent of the rendering and animation algorithms of these virtual entities.

Figure 2:
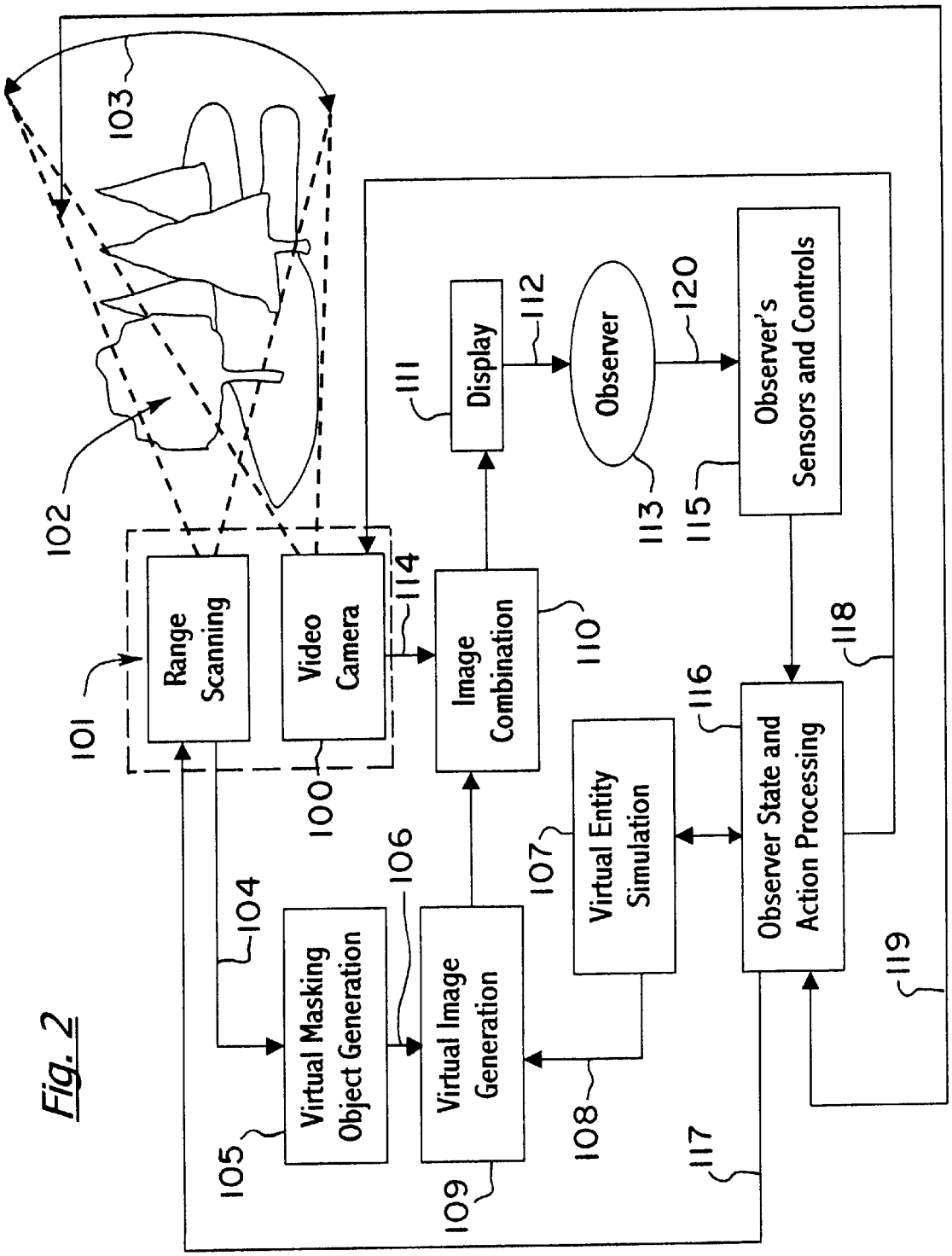
FIG. 2 is a simplified block diagram showing the major steps in the present method.

The block diagram of FIG. 2 shows the major steps of the present method. One implementation of the present invention is diagrammed in FIGS. 16 through 22.

Range Scanning

Turning to FIG. 2, a range scanner 101 determines the distance of the entities present in a real-world scene 102 within small ranging sectors. Each ranging sector is defined as a small angular sector (e.g., 1 milliradian in height and width) and by its azimuth and elevation, seen from a momentary observation point. The ranging sectors are included within the field of regard 103 of the range scanner 101. Scanning is limited in range, for example to 1000 meters. Range scanning may be performed by a laser range scanner (as in the reference apparatus shown in FIGS. 16–22) or by other means that can determine the distance of objects within the angular space of ranging sector. Range data 104 are generated by the range scanning step, and include azimuth, elevation, and range to the nearest object for each ranging sector.

Range scanning is an existing technology that provides range data necessary for virtual masking object generation. Normally, existing ranging systems will be used. The type of scanning will depend on the range and ranging sector requirements of a particular implementation of the invention for a specific application. For a range requirement of approximately 400 meters, and angular resolution of approximately 1 milliradian, a 905 nanometer eye-safe infrared laser scanner was sufficient in the reference apparatus.

In lieu of laser range scanning, other types of range scanning can provide sufficient range data for the present system. Examples of other scanning methods include three-dimensional radar scanning for longer ranges (multiple kilometers), or acoustical ranging for short ranges (e.g., within 50 meters). Active flash ranging methods, in which the acquisition of range for the ranging sectors is achieved in a simultaneous manner, covering the whole field of regard by phase-modulated laser or radar ranging flashes, or by multiple amplitude-modulated laser or radar pulses, are also applicable for short ranges. Passive ranging methods (e.g., stereographic or parallax comparison of real-world scene elements) can also be used, when their angular resolution fits the requirements of a specific application.

The frequency of range data updates imposed on the range scanner depends on the type of real-world scene considered for specific implementations of the invention. A 266 Hz laser pulse rate was used for scanning the static scenes considered for the reference apparatus in FIGS. 16–22. The field of regard was scanned from a static observation point with approximately 26,000 ranging elements to provide a range frame update rate in the order of 0.01 Hz. For dynamic scenes with a moving observation point and mobile elements within the real-world scene, the system will normally require considerably higher range scanning pulse rates, such as 30 KHz, and a range frame update rate for the field of regard in the order of 1 Hz or higher.

Range, azimuth, and elevation data may be provided directly for each ranging sector, or indirectly, by providing only the range in each ranging sector, the scanning row number in the case of horizontal scanning for each row, and a frame start and stop signal. In this case, the angular width and height of each ranging sector is also provided.

Virtual Masking Object Generation

Virtual masking object generation 105 is a key step of the invention. The ranging data of the ranging sectors are used to define the virtual masking objects 106 corresponding to real world objects. The range map obtained in a 0.261 radians wide and 0.096 radians high field of regard by a 905 nanometer wavelength infrared scanning laser, scanning an area of small grassy hillocks, a parked automobile van, and a tree is shown in FIG. 3. The range return for each 0.98 milliradian×0.98 milliradian ranging sector is encoded as a gray intensity value, longer distances are shown in darker shades. Areas of no return are shown in white. Such range maps are raw data, normally requiring further processing.

Rectangular virtual masking objects can be generated from the raw data at the measured range, having the angular width and height of each ranging sector, to mask portions of the images of such virtual entities as may lie beyond this virtual masking object. This is one method within the scope of the invention for virtual masking object generation. Another, alternative approach is to apply a statistical filter to the raw ranging data in order to establish coherent, larger virtual masking objects (FIG. 4). The software code used for generating larger virtual masking objects, as shown in FIG. 4, is listed in Appendix A. The conditions for establishing coherence of virtual masking objects in the software code of Appendix A are listed in Table 1. These conditions are associated with the specific method of ranging in the reference apparatus, which uses horizontal scan lines, advancing vertically from scan line to scan line.

Alternative rules may be used for establishing the virtual masking objects. An example of an alternative method is direct three-dimensional filtering. With this method, individual points defined by their ranging sector's azimuth, elevation and range are added to a virtual masking object as long as new points fall, within a pre-determined tolerance "t" on a common plane, and when such points are contiguous within the tolerance of a hole-filling algorithm.

The above methods result in a geometrical definition of the virtual masking objects. These may be simple quadrangles for a single ranging sector, or complex agglomerations of many ranging sectors into a two or three-dimensional surface. Within the virtual masking object generation step, three additional functions are performed.

Display Construct Generation

Display construct generation builds data constructs compatible with a specific rendering system. For example, the virtual masking objects shown in FIG. 4 were prepared for presentation under the Virtual Reality Modeling Language (VRML), version 2.0 (International Standards Organization ISO/IEC CD 14772), using the "IndexedFaceSet" high-level virtual reality node specification. This is reflected in the last section of the software code in Appendix A written in the Java language. Other sections of the software code are generic and independent of the actual rendering system used. The invention itself is independent of any specific rendering implementation.

Display Attribute Preparation

Display attribute preparation is the last processing function of the virtual masking object generation step. This function may be separate from, or coincident with the display construct generation function, depending on the specific rendering system and image combination system used. The virtual masking objects must be rendered with display attributes that permit the automatic replacement of their pixels in the image combination step with a video background representing the external world. This attribute depends on the specific image combination hardware, and is usually referred to as the background attribute. The VRML 2.0 display construct and background display attribute of one of the grassy knolls shown in FIGS. 3 and 4 is listed in FIG. 5. The background attribute is set as the ambient intensity, diffuse color, and shininess values in the material node of the construct, and corresponds to values set for a DeltaScan Pro GL GenLock system for image combination. Other image combination systems may use different attributes, such as a specific blue background color.

The use of any particular rendering system, such as the Virtual Reality Modeling Language, is not claimed as part of the invention, and the method described will work with any rendering system capable of rendering three-dimensional objects, or two-dimensional projections of three-dimensional objects. VRML is used for virtual object definition in the reference apparatus, rendered through VRML browser software.

The effect of implementing the virtual masking object described in the VRML display construct of FIG. 5 is shown in FIG. 6. The grassy knoll of FIG. 5 is approximately 45 meters from the origin of the coordinate system located at the observation point of the user of the invention. By placing the virtual image of a cube beyond the grassy knoll, at 49.5 meters from the origin, and the virtual image of a sphere in front of the grassy knoll, at 42.5 meters from the origin, the masking effect of FIG. 6 is obtained, assuming a white background attribute. The actual virtual objects present in the scene, including the grassy knoll's virtual masking object, are shown in FIG. 7.

Time Processing Algorithms

Time processing algorithms are used for dynamic scenes in the virtual mask generation step in cases when the range frame rate achieved by the range scanning is not sufficient to provide the illusion of continuous motion (25–30 Hz range frame rate) of the virtual masking objects. With single-beam sequential scanning methods, which are normally used for long ranges of several hundred meters to multiple kilometers to establish a range map, the achievable range frame rate is limited by the speed of light.

As an example, in the laser range map of FIG. 3, there are 26068 ranging sectors. A sequential ranging system, such as the laser range scanner used in generating FIG. 3, limited at 1500 meters range, has an out-and-return time frame of 10 microseconds for the range scanning laser pulse for each ranging sector. In this case this results in a minimum possible frame update time of 0.26 seconds, or a maximum possible range frame rate of 3.83 Hz. Practical considerations of actual ranger electronics implementations make the achievable range frame rate lower than this theoretical limit. The time processing algorithms linearly extrapolate the advance of the vertices of existing virtual masking objects to obtain the intermediate geometry of these objects between range frame updates obtained by range scanning. An example of the equations implementing time extrapolation for the azimuth $A_n$, the elevation $E_n$, and range $r_n$ of a virtual masking object with N vertices is shown in FIG. 8. In these equations t is the time for which the extrapolation is performed, T1 is the time of acquisition of the latest range frame, and T0 is the time of acquisition of the previous range frame.

The time processing extrapolation algorithms will be executed normally at a lower frequency than the maximum update rate of 25 to 30 Hz required for the illusion of continuous motion. The extrapolation algorithms can be invoked by control algorithms on an as-needed basis. The logical conditions for invoking and controlling time processing are listed in Table 2. A set of three dimensional "envelope points" (e.g., the ranging sectors of maximum and minimum azimuth and elevation) are selected at the time of acquisition of each virtual masking object for implementing the conditions of Table 2.

Figure 9:
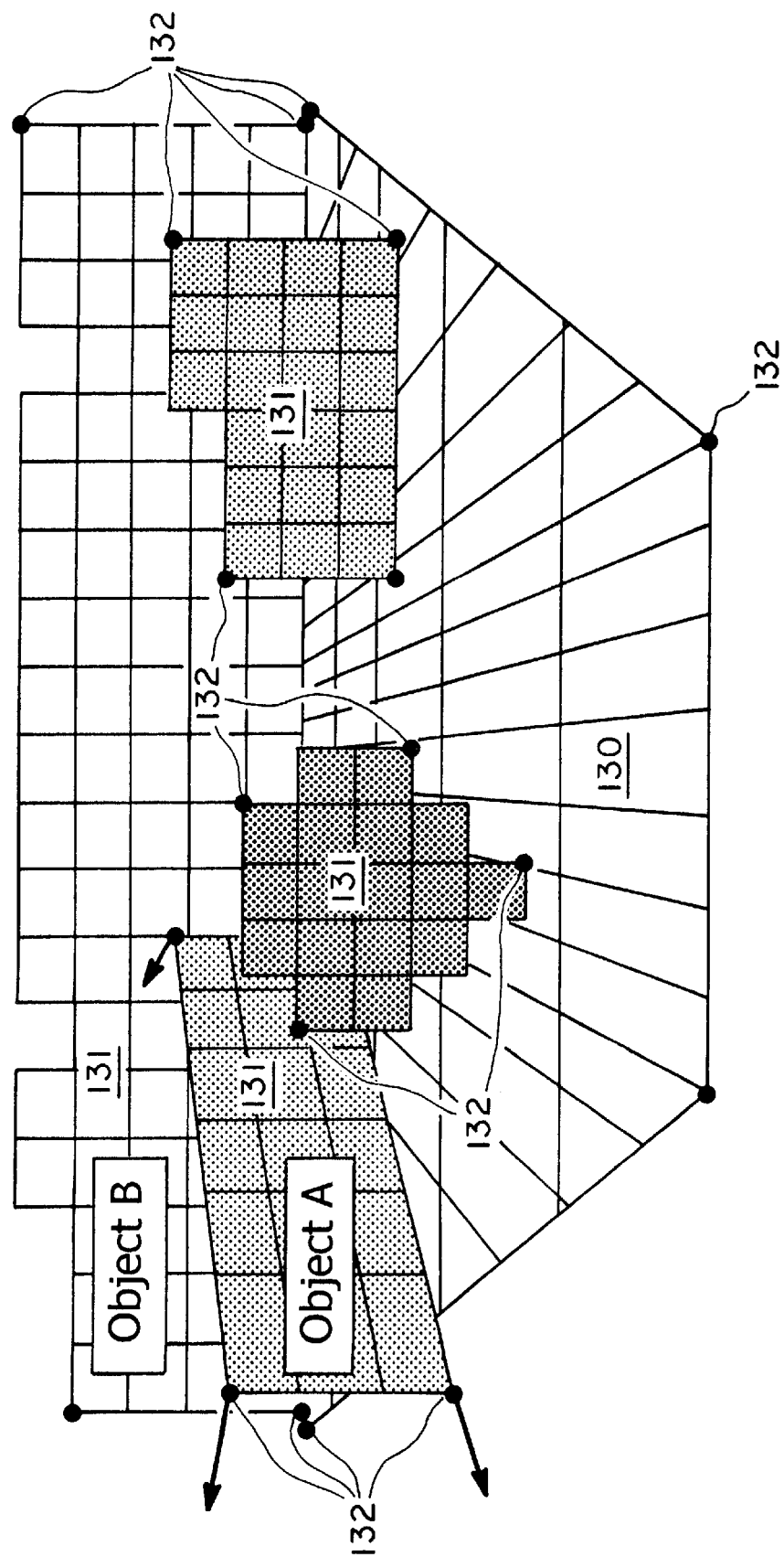
FIG. 9 is a three-dimensional example of a field of regard illustrating the use of time processing algorithms.

FIG. 9 illustrates the logic conditions of Table 2. It shows several virtual masking objects, including the apparent terrain 130 observed by range scanning, and other virtual masking objects 131, which include Object A located near to the observation point, and Object B located at the extreme range of range scanning. The envelope points for each virtual masking object are also indicated as black dots in FIG. 9.

The angular position of the envelope points of Object A is assumed to have changed between the last two frame updates as shown by the arrows. If the angular movement of the left-side envelope points of Object A exceeds two ranging sectors (or a minimum number of ranging sectors as specified for a particular implementation) the extrapolation code will be invoked at least for some of the vertices of Object A by the invocation logic.

The angular position of all of the envelope points of Object B in FIG. 9 is assumed to have been less than two scan sectors (or the minimum value specified for the implementation), therefore no extrapolation processing takes place for Object B.

Time processing algorithms do not need to be implemented at all in those applications of the invention in which the observation point of the user of the invention is static, and the real-world field of regard of interest does not contain moving real-world entities.

Although the method of virtual masking object generation is an element of the overall method of the invention, the specific form in which the virtual masking objects are implemented depends on what existing method of virtual object generation and rendering is used in a particular implementation of the present system. The example of FIG. 5 uses the Virtual Reality Modeling Language (VRML). Alternatively, a Distributed Interactive Simulation Standard (IEEE 1278–1995) implementation may be utilized. When VRML is used, virtual masking objects are updated through nodes injected by Java code, shown in the computer code listings of Appendix A. When the Distributed Interactive Simulation Standard is used, the virtual masking objects may be generated as Entity Appearance Protocol Data Units, or Dynamic Terrain updates. The method of virtual masking object generation is compatible with any virtual entity generation and rendering method.

Virtual Entity Simulation

107 in FIG. 2 is a step of the method performed through existing technologies for computer simulation. Virtual entities may be simulated, by the animation and control techniques available through the Virtual Reality Modeling Language (VRML). An example of this approach is shown in the listing of Appendix B, in which three battle tanks are animated. Alternatively, the virtual simulation techniques defined in the Distributed Interactive Simulation Standard (IEEE 1278–1995) may be utilized. Virtual entity simulation generates continuously virtual entity appearance data (108 in FIG. 2). With VRML, the virtual entity appearance data are updated through animation code implemented as ROUTE constructs, Script nodes, or nodes generated through Java code. When the Distributed Interactive Simulation Standard is used, the virtual entity appearance data are generated as Entity Appearance Protocol Data Units. The invention is compatible with any virtual entity simulation. It is also compatible with a combination of virtual and real entities interacting with the observer, in which case the entity appearance data of real-world entities are transmitted to the apparatus implementing the method by radio or other remote means. In this case, the virtual simulation generates the avatars of the real-world entities, and resolves interactions with the avatars in the same way interactions with virtual entities are resolved.

Virtual Image Generation

109 in FIG. 2 renders the virtual entity appearance data generated by the virtual entity simulation and the virtual masking objects. The rendering process itself depends on the particular implementation of the present system. It can be implemented using existing technologies, such as VRML, or the Distributed Interactive Simulation Standard (IEEE 1278–1995), or other, commonly available virtual entity rendering methods. The virtual entity appearance data result in virtual images rendered in their normal appearance attributes, that is in their color, texture, intensity and other attributes as defined in the virtual entity simulation. The virtual masking objects, and all background of the virtual scene, are rendered in the background attributes compatible with the image combination techniques used in the image combination step. As a result, the virtual image generation step 109 renders masked virtual images, in which those elements that would be masked by natural objects are missing from the images of the virtual entities rendered from the virtual entity appearance data, as shown in FIGS. 1c and 6.

Image Combination

In this step 110 of FIG. 2, the virtual images constructed in the virtual image generation step 109 are combined with the real-world image 114 originating from the video camera 100. The invention is not limited to observing the real world in the visible spectrum. The video camera may operate in the ultraviolet or infrared range, and it may be replaced by a sensor such as a radar device, when the user of the system wishes to obtain a real-world image in a non-visible spectral region. The field of regard 103 of the camera 100 coincides approximately with the field of regard of the range scanning 101. The image combination step utilizes commercially available hardware, together with commercial or specially-built software for combining the virtual images with the real-world image. The video image will fill out all areas of the display 111 rendered in the background attribute. In the case when the real-world image is provided as an analog video signal, a feasible technique to implement this step is to use a video "GenLock" board, such as a DeltaScan Pro GL used in the reference apparatus, setting the background attribute to 0 intensity, and black color, as shown in the code example of FIG. 5. When the real-world image is supplied as digital video or a digital sensor's data stream, the pseudo-code shown in FIG. 10 will implement the appropriate image combination.

Figure 11:
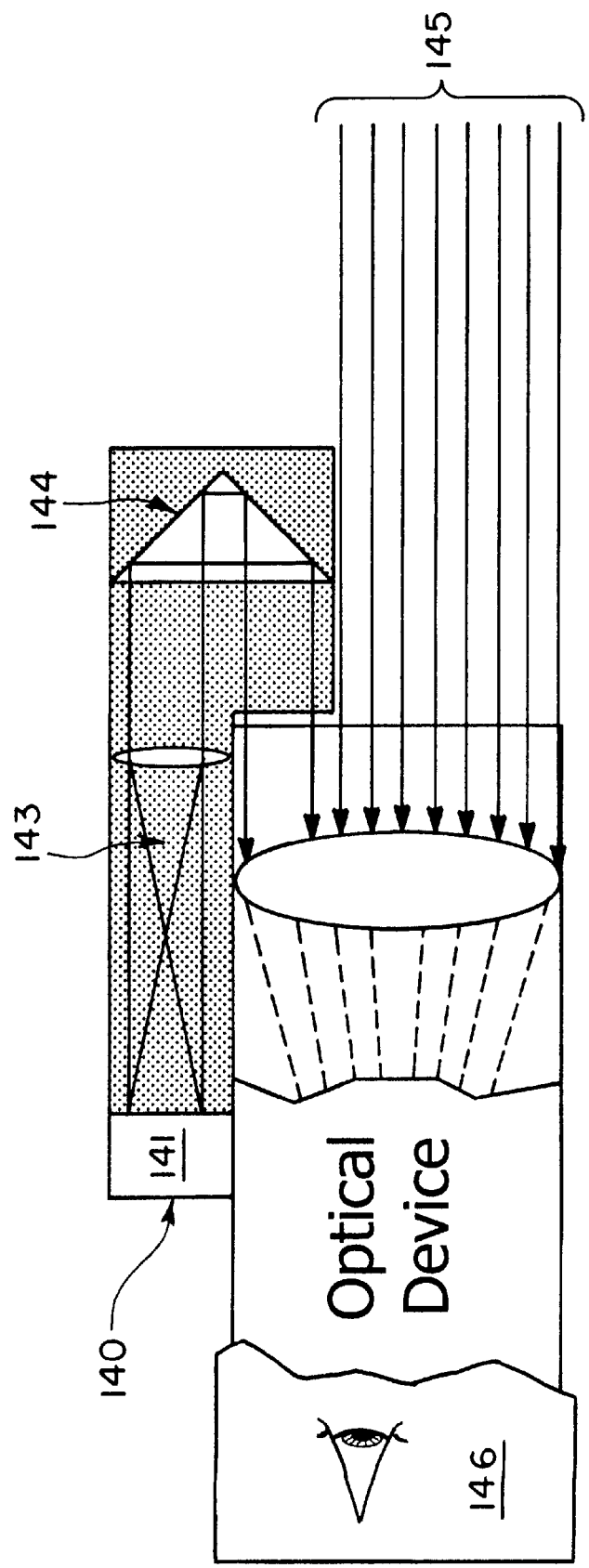
FIG. 11 is a simplified diagram showing one embodiment for injecting virtual images into a real-world scene.
Figure 12:
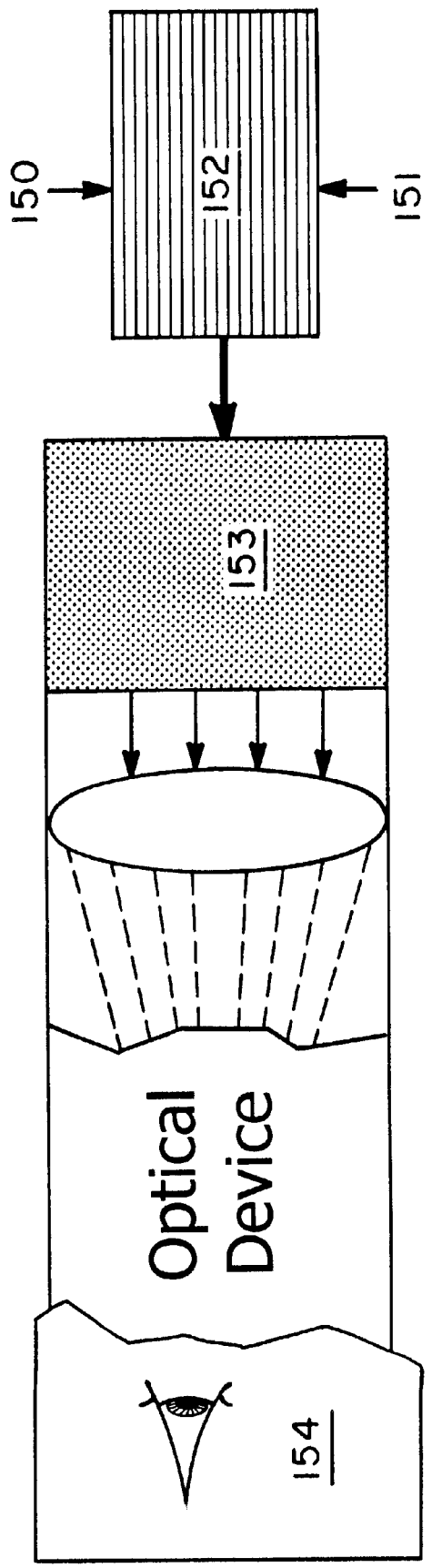
FIG. 12 is a simplified diagram showing an alternative embodiment for combining a virtual image with a real-world image.

Image injection is an optional method of image combination, to be used when the observer 113 would normally observe the real-world scene through an instrument, such as the gunsight of a tank or the optics of a camera. Two alternatives of image injection are virtual image injection (FIG. 11), and combined image injection (FIG. 12). In FIG. 11, the virtual image output 140 of virtual image generation is displayed through a color video projector 141. It is then focused at infinity through a collimator 143 and prism 144 and injected into the collimated field of an optical device (such as the gun sight of a battle tank, the optical train of a motion picture camera, or the optical train of any other optical device used for viewing the combined image) normally showing only the real-world image 145. The observer 146 using the optical device will see the virtual image over the whole field of view of the real-world image. In FIG. 12, the combined image 153 is generated from the virtual image 150 and real-world image 151 in a color video display projector 152, which provides the input into an optical display device, such as an advanced gun sight that uses video input as its image source, or the optical train of a motion picture camera.

Display

Figure 13:
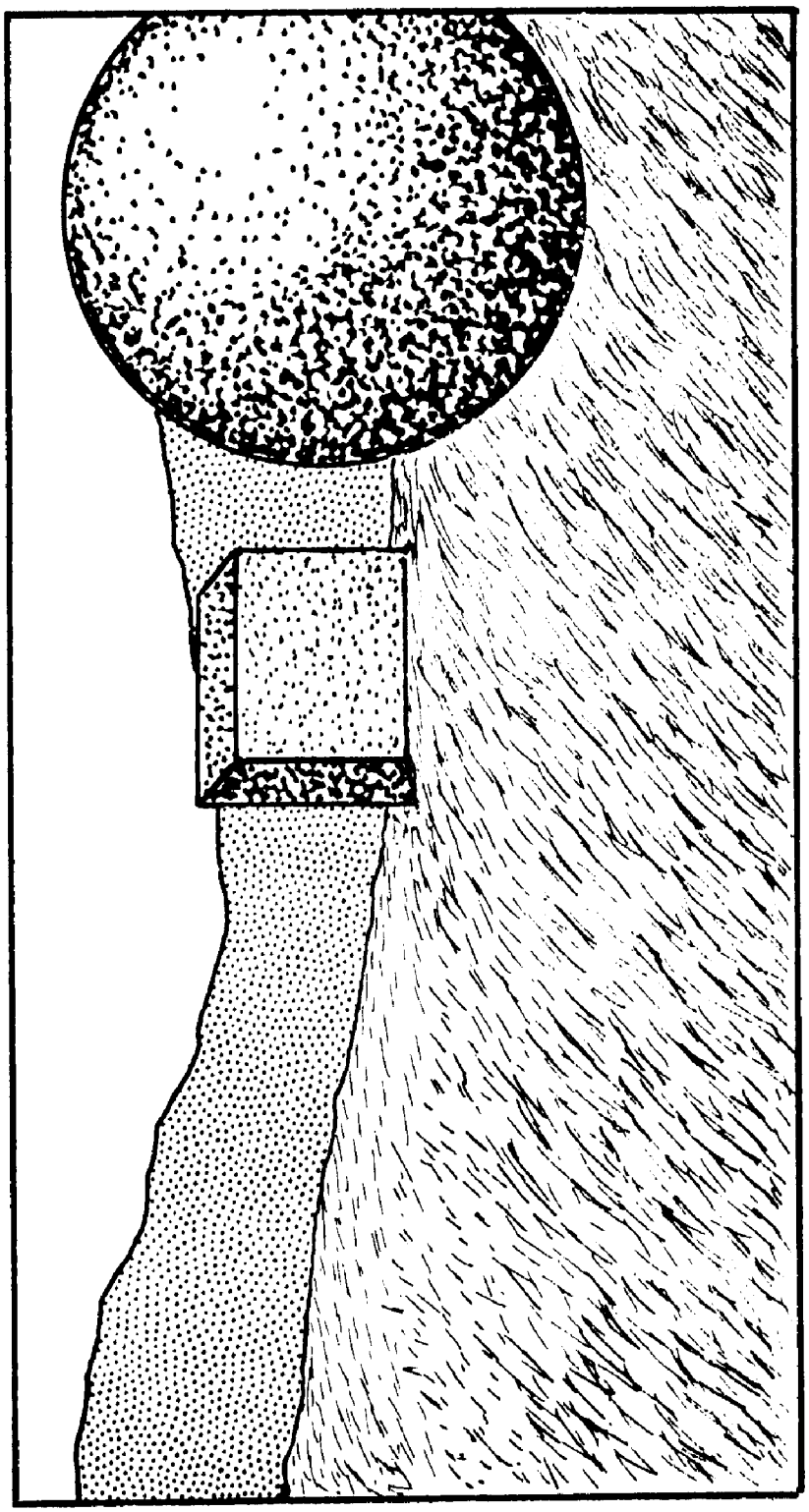
FIG. 13 is an example of a video image combining the virtual image from FIG. 6 with a real-world scene.

The output of the image combination step is shown in the display 111 of the combined image 112 in FIG. 2, presented to the observer 113. The display 111 may be any display system capable of displaying the combined image, such as a video display, an electronic goggle or visor, a video projector, the display screen of an electronic device such as a game, instrument, or sensor, or the optical train of a display and recording device, such as a camera. An example of a combined image display, using a VGA monitor in a 16-bit color depth, 640×480 pixel display mode is shown in FIG. 13. The virtual image of FIG. 6, with the grassy knoll's masking object, was combined with a live video scene obtained as an S-video signal from a color video camera. The live scene includes the live original of the grassy knoll, which appears to be masking out a portion of the virtual cube, while the virtual sphere is rendered with no masking.

Alternative display implementations are compatible with the method. These may include flat display panels, image projectors, or virtual reality goggles or visors worn by the observer. In cases when the observer would normally observe the external world through an optical or other instrument, the virtual images can be injected into this instrument, as described under image injection. In the case of virtual reality goggles or visors, two fields of view may be presented corresponding to what is seen by the left and right eye of the user of the system.

Figure 14:
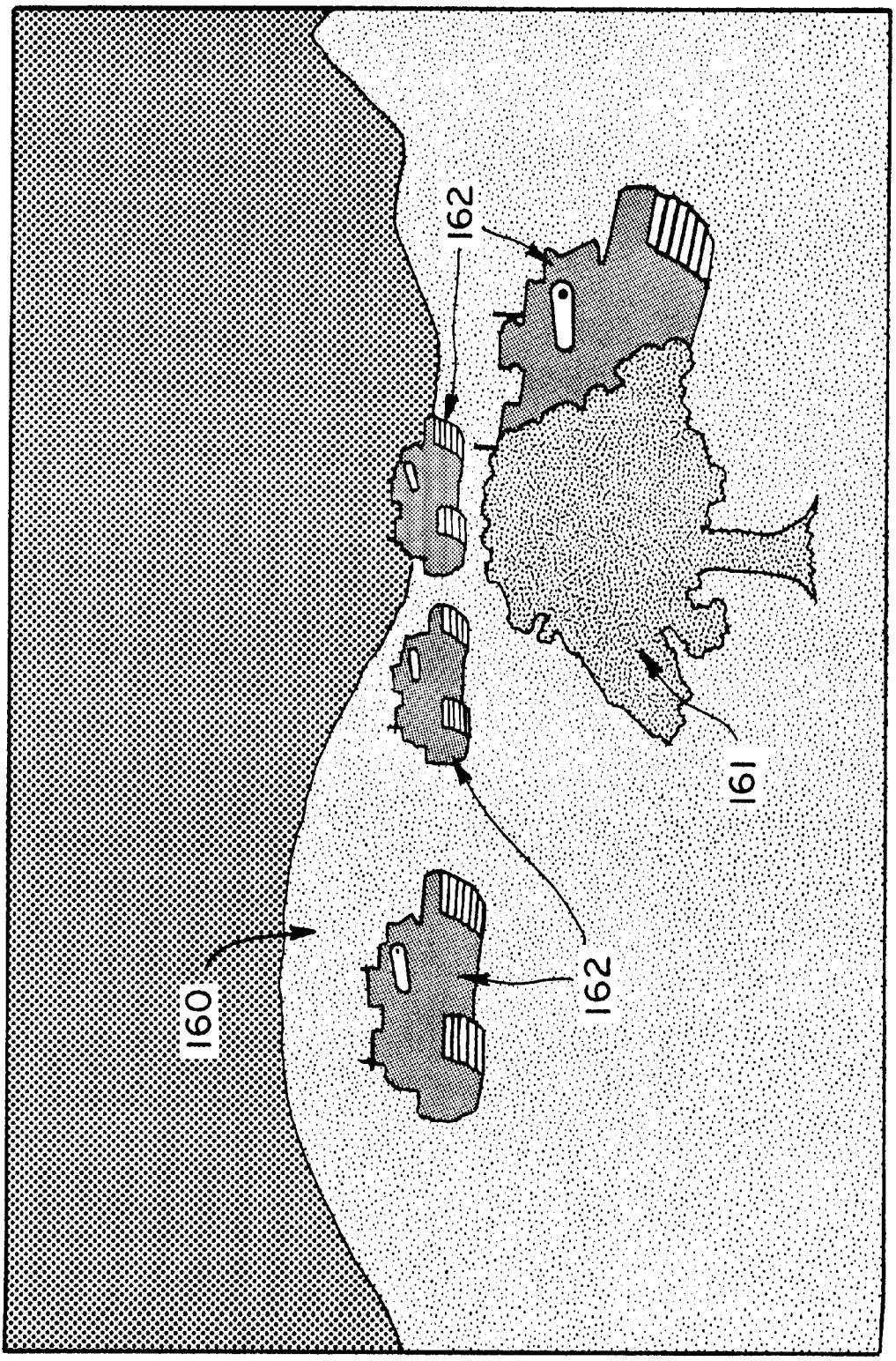
FIG. 14 is an example of a combined view of virtual tanks and the real world in the infrared as seen through the thermal viewer of a tank or infantry fighting vehicle.

The generation of combined images, as described in the method, does not have to reflect what can be seen in the visible spectrum. FIG. 14 shows a combined view in the infrared, as it may show up in the thermal viewer of a modern battle tank or infantry fighting vehicle. The virtual entities generated by a virtual entity simulation do not necessarily represent a real-world object. For example, they may represent fictional characters or entities, or views of conceptual objects. An example of conceptual virtual entities is shown in FIG. 15.

Figure 15:
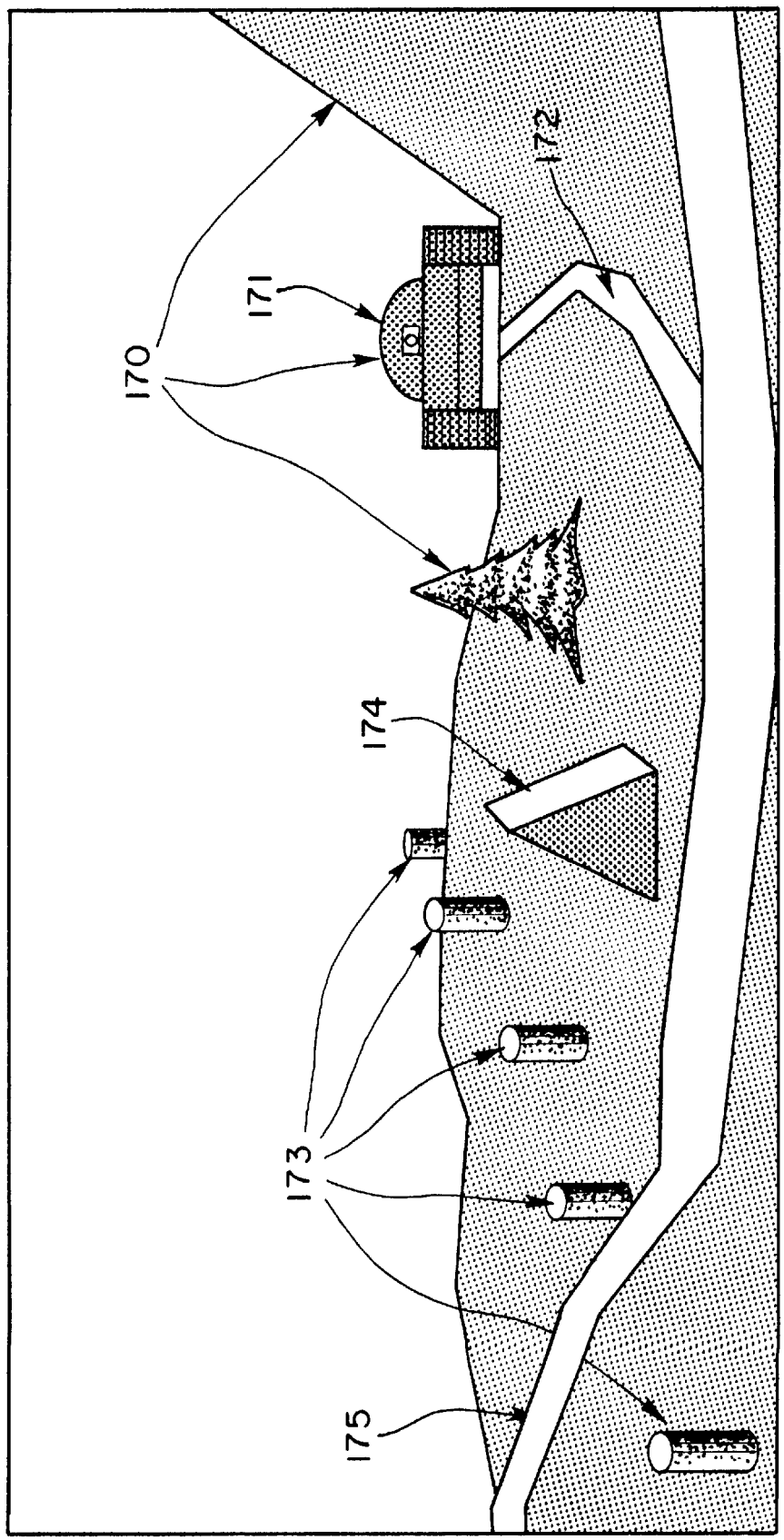
FIG. 15 is an example of a combined view depicting virtual entities in a real-world scene.

In FIG. 15, the real-world objects 170 include the terrain, a tree, and a battle tank, in which the observer or observers 171 of a combined reality view presented to them are located. The conceptual virtual entities in the figure are conceptual objects: a path marker 172, a unit boundary 173, a navigational marker 174, and a phase line 175. The present system positions the conceptual virtual entities in the display in such a manner that they appear to be present in the landscape visible to the observer(s).

Observer Actions

The observer 113 of the display is assumed to be the user of the invention for various purposes, such as military training, or entertainment. The observer may interact with the apparatus implementing the invention through observer actions 120 in FIG. 2. Observer actions include the observer's interactions with virtual elements in the combined reality scene. An example of such direct interaction is the engagement of a virtual opponent from a combat vehicle, such as a battle tank. In this case, the observer (the battle tank's gunner or commander) would observe and track the virtual opponent embedded in the real-world scene through the tank's actual gun sight, and engage it by depressing the trigger of the tank's main gun. This virtual-live interaction will take place by the observer's actions being captured through the observer's sensors and controls 115 in FIG. 2. Observer actions also include interactions of the observer with the real world, such as head movement of the observer, the observer's use of the battle tank's fire control system controls, or the actual firing of the gun through a trigger. The observer's interactions with the real world also include the movement of the observation point (in the case of a battle tank, the movement of the vehicle and rotation of the turret), and the resulting changes of three-dimensional position and attitude. Observer actions that are relevant to virtual-live interactions may also include the steering of a vehicle housing the observer, or manipulation of control devices such as joysticks or pushbuttons applicable to a specific implementation of the invention.

Observer actions in the virtual-live interoperations include magnification (zoom) control of a simulated battle tank gun sight, the tracking of a specific virtual tank, and engagement of a virtual tank being tracked through the simulated gun sight. They also include scenario selection, scenario start, stop, and re-start. All observer actions are sensed by the various components classified as observer sensors and controls 115.

Observer Sensors and Controls

Observer sensors and controls 115 (in FIG. 2) are devices using existing technology, and no specific observer sensor or control is claimed as an element of the invention. The use of observer sensors and controls, however, is an element of the method of the invention. The position and orientation of the observer (including the movement and attitude of the vehicle, if any, housing the observer) is sensed by observer sensors and controls 115 such as a magnetic or infrared head tracker system used in conjunction with virtual reality goggles. Observer controls also sense any signals received directly from the observer, such as changing the optical magnification of a gun sight, or manipulating fire control system controls. These signals in a combat vehicle may be accessed from an electronic signal distribution system, such as a MIL-STD-1553A data bus, which is present independently of the invention. For moving observers, who may be individuals moving in the real world, or housed in a vehicle, the observer sensors include a position determination system, such as a differential Global Positioning Satellite System (GPS). If the platform housing the observer changes its spatial direction, an attitude sensing system, such as a three-antenna GPS system measuring angular differences by signal phase shift measurements must be included in the suite of observer sensors. Observer's sensor and controls normally include displays or signals resulting from feedback from the virtual simulation, such as virtual battle damage.

In the reference apparatus, GPS survey and optical line-up with surveyed landmarks are used to determine the observer's position and the direction of the scanner and camera optical axes. Observer controls include software-implemented pushbuttons, option selection buttons, and selections from lists of multiple choices, displayed on a color VGA screen, and activated by a mouse control device.

Observer State and Action Processing

The signals generated by the observer sensors and controls are stored and processed by the Observer State and Action Processing step 116 in FIG. 2. State vectors (three-dimensional position, angles, velocity, and angular velocities) are generated for the observer, and for the observer's vehicle (if any). Observer actions sensed by the observer's sensor and controls are transformed into data or control signals appropriate for responding to the observer's actions. As an example, some of the observer actions processed by the present system are listed in Table 3:

Observer action processing may interact with the scanner and camera controls. For example, when the magnification level of the simulated gun sight is changed by the observer, the video camera's 100 zoom level is changed through the observer state and action processing software, by sending a control signal 118 to the camera's electronic control board, which in turn changes the zoom lens position.

Changes in the position and orientation of the observer, of a vehicle housing the observer, or of movable elements of the vehicle (e.g. a tank's turret) as sensed by the observer's sensors and controls are processed by the observer state and action processing step. The virtual entity simulation receives this information for updating the simulation, in which the avatar of the observer, or the avatar of the observer's vehicle is represented. Both the virtual entity simulation and the virtual masking object generation function will respond to the position and attitude changes of the observer, or the observer's vehicle. Such changes will affect the angular orientation of the virtual entities and virtual masking objects, and the apparent distance from observer to virtual entities and masking objects. Changes in the head position of the observer in some implementations of the invention will control the optical axes of the video camera and range scanner, to ensure that scanning and real-world scene acquisition coincides with the observer's current field of view.

When the observer's sensors and controls include signals acquired from a vehicle, such as the fire control system information acquired through a data bus in a battle tank housing the observer, this information is also processed in this step. For example, in computing whether a virtual opponent was actually hit by fire from the host vehicle's main gun, the fire control system data available from the vehicle bus are utilized. The result of such calculations is then fed to the virtual entity simulation to provide damage information.

Information fed back from the virtual simulation is also processed in the observer's state and action processing step. For example, if one of the virtual tanks represented in this simulation engage the avatar of the observer's tank, the resulting damage information will activate damage displays, or a "killed" indicator in the observer's sensors and controls suite.

Reference Apparatus

Figure 16:
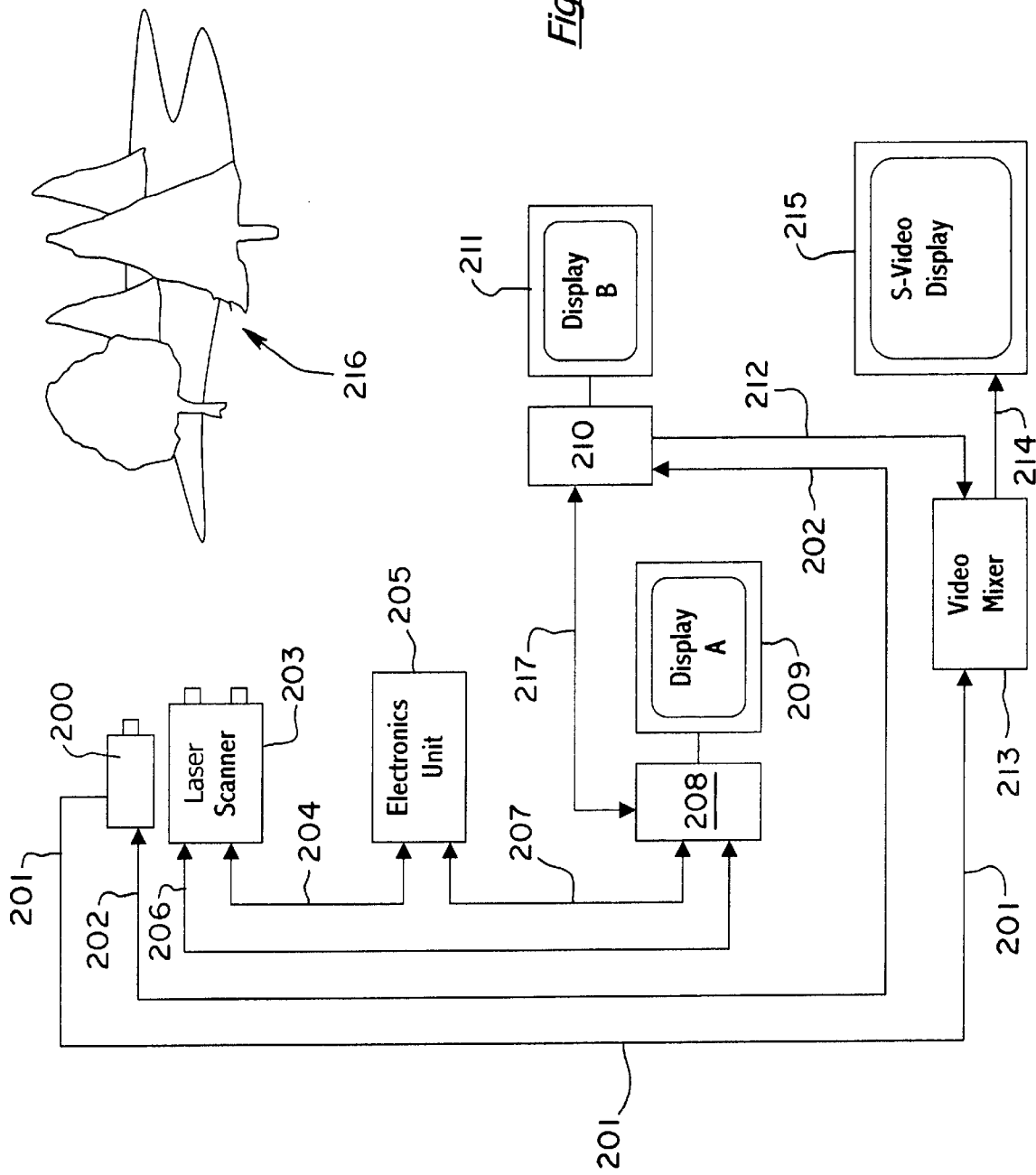
FIG. 16 is a simplified block diagram of the reference apparatus showing one possible implementation of the present system.

FIG. 16 is a simplified block diagram of the reference apparatus showing one possible implementation of the present invention. The real-world scene 216 is observed through a video camera 200, and it is range scanned with the laser scanner. The video camera is a commercially available remote-control camera. The video camera can be moved in pitch and yaw (pan motion), and also zoomed through a nominal magnification range of 1.55× through 10× magnification. These functions are activated by the digital control signals sent to the camera's internal control board through an RS-232 camera control cable 202. The internal control board, in response to these signals, activates the camera's zoom, pitch, and pan motors. Through built-in sensors, the camera also senses the current zoom, pan, and pitch values, which are used by the internal control board as feedback signals, and are available through the camera control cable 202 for external processing. The video signal, in the S-video analog format, is acquired from the camera through the video cable 201, which connects to the video mixer through its S-video input port.

The laser scanner 203 is a modification of a commercially available solid-state infrared surveyor's ranging laser, operating at 905 nanometer wavelength, sending out 40 nanosecond repeated laser pulses at 47 wafts peak power. Range is determined by measuring the time differential between start of a pulse, and the start of the reflected return signal, separated from ambient light by a narrow band filter. Modifications made to the laser unit's electronic control board made by the manufacturer have set the pulse rate at 266 Hz for range scanning use. The laser, in normal surveying operations, without the use of retro-reflectors, has a maximum range of approximately 1200 m. This range is reached by processing multiple returns from the same target, and utilizing a set of logic functions which disregard uncertain returns. The laser has separate sending and receiving apertures. The scanner elements are built from commercially available components, as shown in the schematics of FIGS. 17 and 18.

Figure 17:
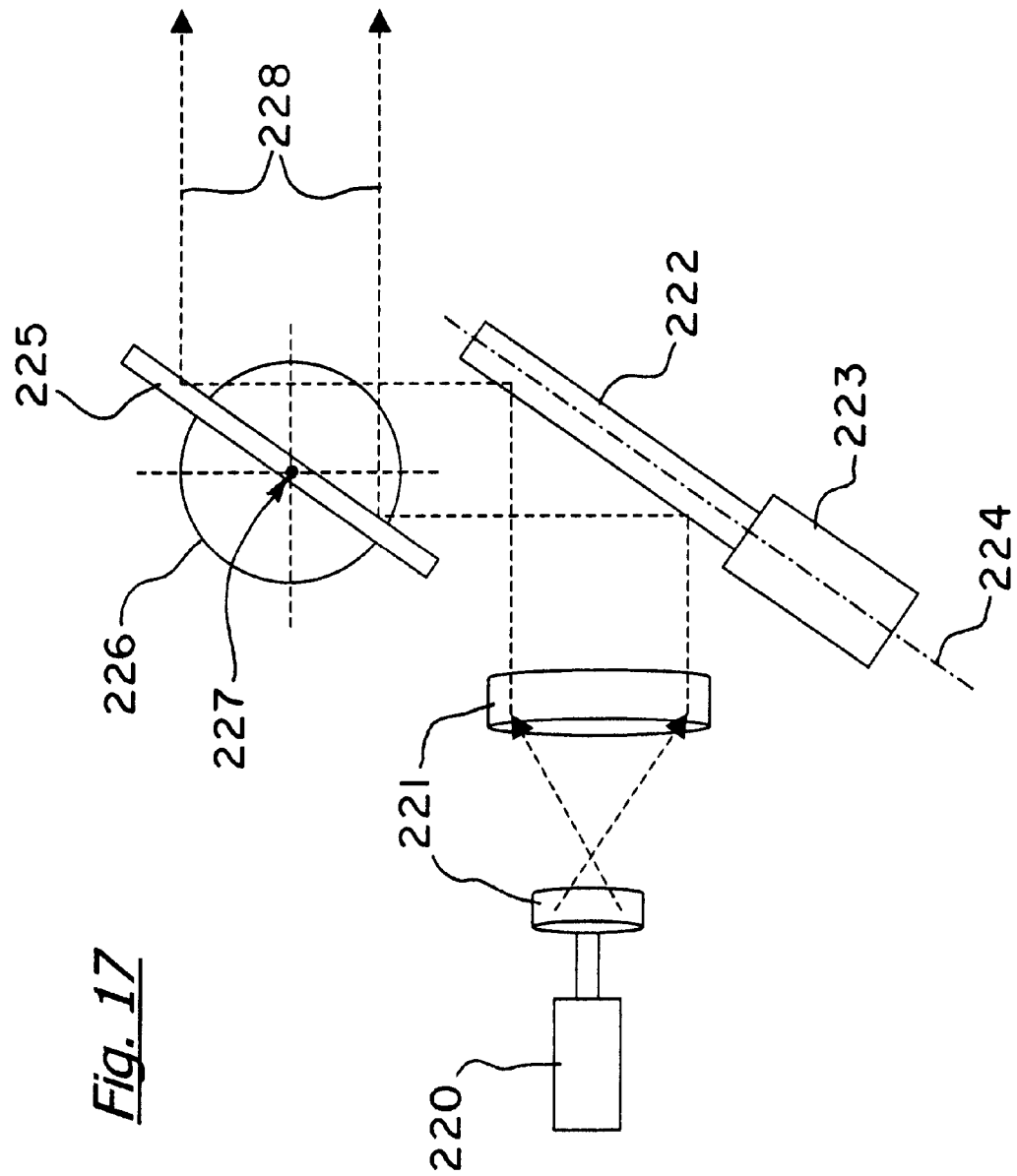
FIG. 17 is a simplified diagram of the transmitter section of the laser range scanner.

The transmitter section of the laser scanner, shown in FIG. 17, reflects the laser beam 228 originating from the laser diode 220 and focused through the lens system 221 of the commercial laser unit through a horizontal scan mirror 222 and a vertical scan mirror 225. The horizontal scan mirror is mounted on a shaft, which rotates around the horizontal scan axis 224, driven by the horizontal scan motor 223 in steps equal to ½ of the horizontal angular width of the ranging sector (approximately 0.49 milliradians). The horizontal scan mirror doubles the relative incidence angle of the laser beam, resulting in horizontal scan steps incremented by the horizontal angular width of the ranging sector. The direct current stepping motor is controlled through the electronics unit 205 in FIG. 16, which steps the motor 266 times per second, coordinated with the laser pulses fired by the ranging laser. Time marks corresponding to the laser firing signals are transmitted through the RS-232 scan control cable 204 from the laser's built-in electronic control board to the electronics unit of the apparatus 205. The electronics unit, in turn, commands the steps of the horizontal scan motor. The timing of the electronics unit commands to the scan motor is generated so that it precedes the next laser pulse firing by approximately 15% of the cycle time between laser pulses, providing adequate settle time for the horizontal scan mirror. The horizontal scan mirror is a 15 mm diameter circular mirror, controlling a laser beam of approximately 8 mm in diameter, and expanding at an angle of 0.98 milliradians. The horizontal scan mirror performs a linear nodding motion about the horizontal scan axis. After completing a horizontal scan line of 266 steps, the next scan line proceeds in the opposite direction after the laser beam's elevation is changed by the vertical scan mirror. The resulting scanning pattern is shown in FIG. 19.

The vertical scan mirror 225 is stepped by half of the vertical angular height of the ranging sectors (approximately 0.49 milliradians) upon the completion of each horizontal scan line. The vertical scan mirror, driven by the vertical scan motor 226 is mounted on a shaft that rotates about the vertical scan axis 227, which is perpendicular to the horizontal scan axis. The steps of the vertical scan motor are controlled by the electronics unit 205 through the scan control cable 204. Each vertical step is activated in response to an opto-mechanical interrupter connected to the horizontal scan mirrors. At the end of the scan line, the mechanical element of the interrupter interrupts a light beam incident on a commercially available photo-electronic sensor, which in turn interrupts an electronic signal sent to the electronics unit through the RS-232 control cable. The elevation of the outgoing laser beam 228 is raised by an angle corresponding to twice the angular step of the vertical scan mirror, resulting in the scanning pattern shown in FIG. 19. The control logic of scanning is summarized in Table 4.

Figure 18:
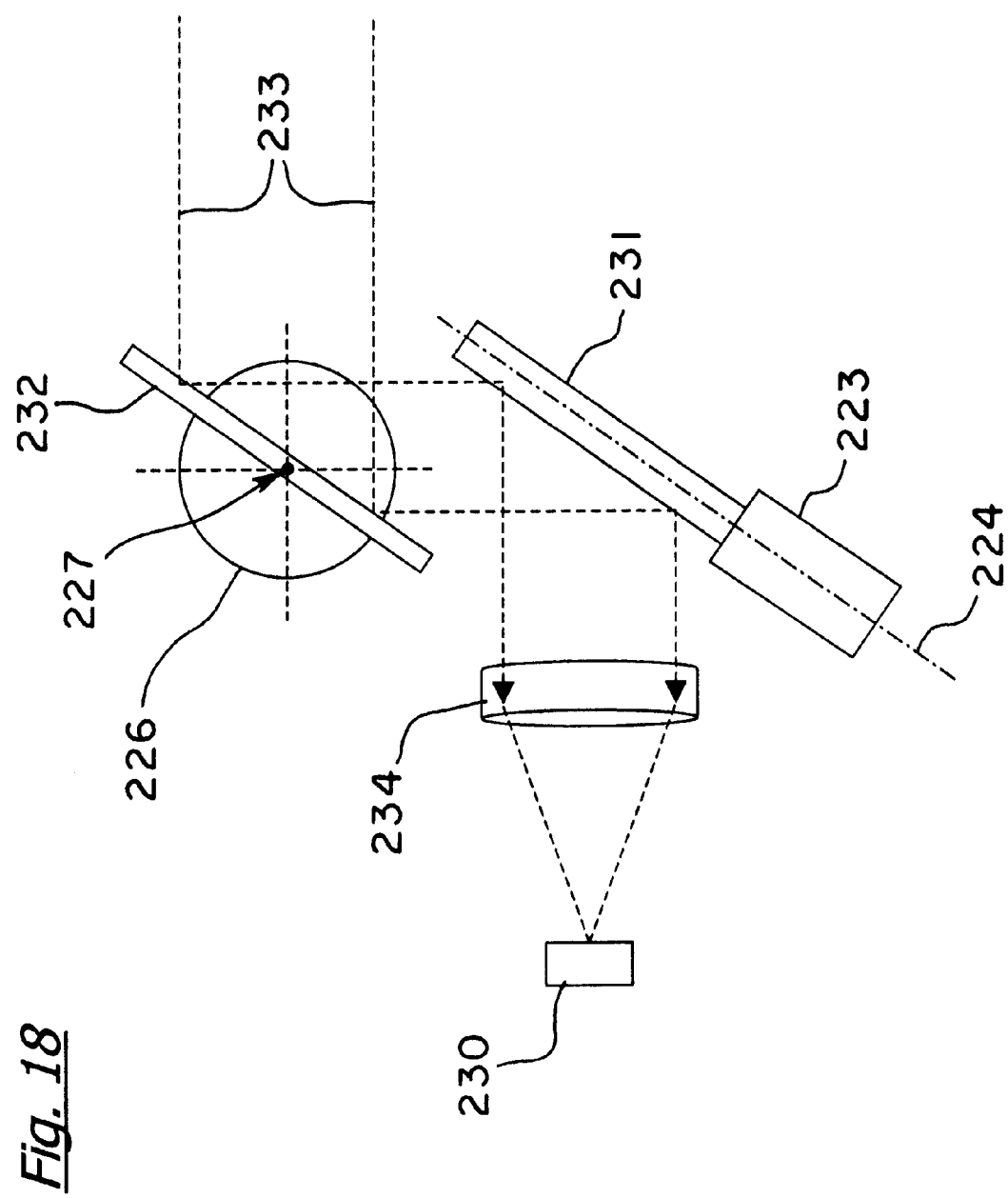
FIG. 18 is a simplified diagram of the receiver section of the laser range scanner.

The receiver section of the laser apparatus, shown in FIG. 18, is closely integrated with the transmitter section. The incoming laser reflection 233 is reflected through the vertical scan mirror 232, and the horizontal scan mirror 231, into the sensor cell 230 of the laser electronics unit. The vertical scan mirror is mounted on a shaft rotating about the vertical scan axis 227. This is the same shaft, rotating about the same axis as the one mounting the vertical scan mirror of the transmitter section. The angles of vertical scan mirrors of the transmitting and receiving sections are therefore always at the same angle, except for dynamic transients of shaft rotation at their respective mounting points, resulting from the shaft's response to the motor steps. The horizontal scan mirror of the receiver section is also on a common shaft with the horizontal scan mirror of the transmitter section, rotating about a common axis 224, driven by the same horizontal scan motor 223. The lens system 234 and the sensor cell of the receiver section are standard elements of the commercial laser range finder used in the laser range scanner. The distance of the object causing the laser reflection is measured by the electronics section from the time difference between firing the outgoing laser beam 228 (in FIG. 17), and the laser reflection.

Figure 19:
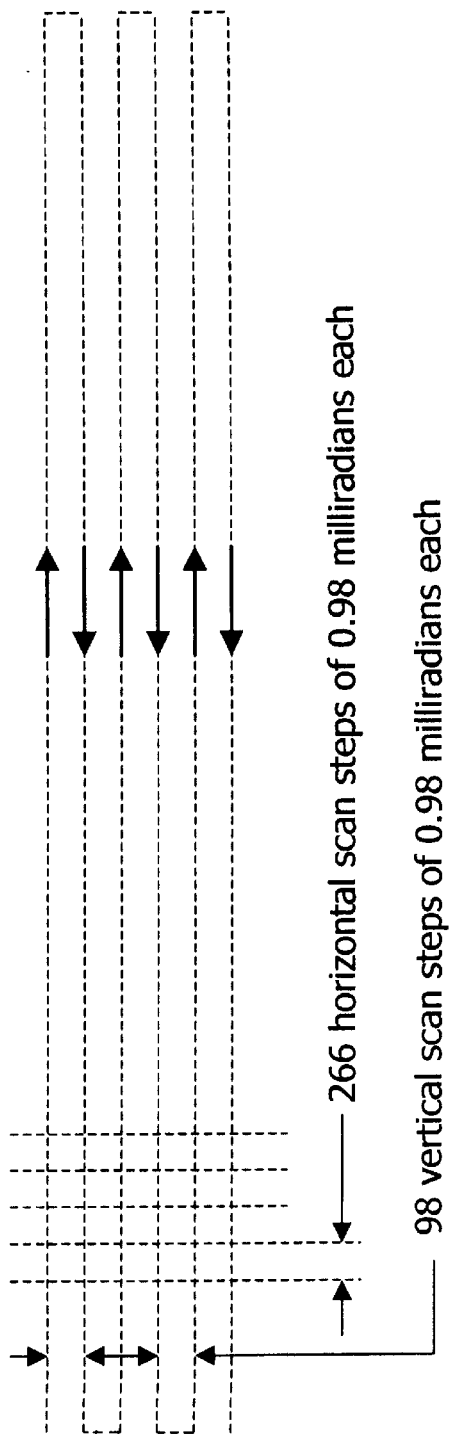
FIG. 19 is a diagram of the scanning pattern for the laser range scanner.

The laser scan pattern of the reference apparatus is shown in FIG. 19. Six horizontal scan lines are shown. Each scan line is composed of 266 scan steps. The arrows on the scan lines show the direction of advance of scanning for each scan line. The scan frame for this implementation is defined as the 98 successive scan lines implemented by the apparatus. Successive scan lines proceed from the highest azimuth at the top of the scan frame to the lowest azimuth at the bottom of the scan frame. Upon completion of the scan frame the scan starts with a new scan frame, at the top of the scan frame.

The laser range data signals, resulting from each laser pulse-reflection sequence, are delivered through the standard RS-232 laser signal cable 206 in FIG. 16 to the laser scanner control computer 208. These signals may be, at the option of the operator, displayed by the laser scanner control computer in Display A 209 in FIG. 16, (e.g., a VGA display) as range maps, such as shown in FIG. 3. The laser range data signals received by the laser scanner control computer are re-formatted to the laser data format of the reference apparatus for transmission to the virtual simulation computer 210 through the RS-232 laser data cable 217. The laser data format used in the implementation of the invention outlined in FIG. 16 is described in Table 5. The invention itself is independent of any specific data format used for transferring range scan measurements.

Start and stop commands for starting up the laser are transmitted to the laser range scanner directly from the laser scanner control computer through the RS-232 laser signal cable 206. Scanner motor start and stop commands are transmitted from the laser scanner control computer through the RS-232 interface control cable 207 to the electronics unit 205, which executes the stepper motor control programs. These programs, in turn, generate the detailed stepper motor control signals sent to the laser range scanner through the scan control cable 204.

Figure 20:
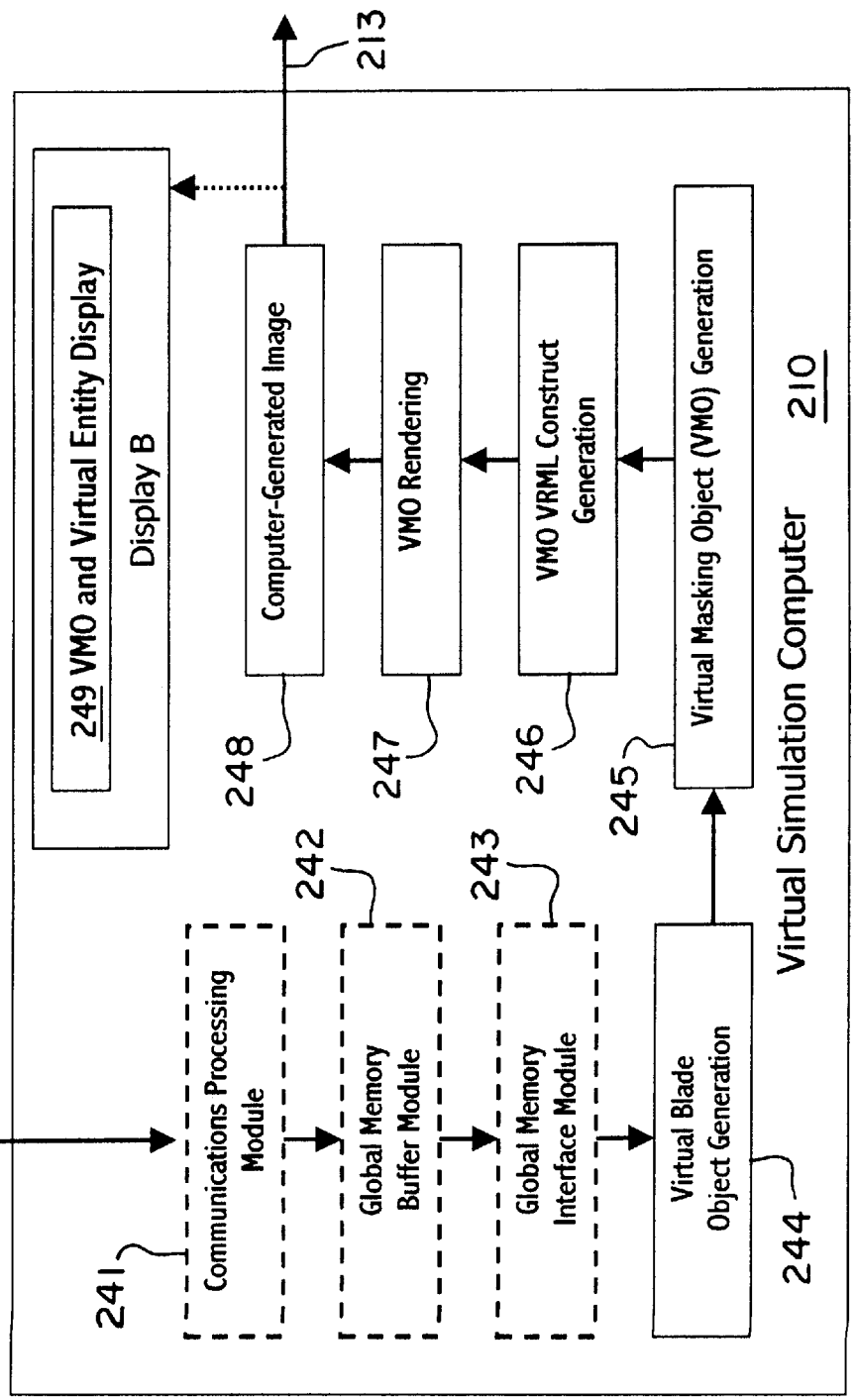
FIG. 20 is a simplified block diagram of the virtual masking object (VMO) generation software.

Virtual masking object generation is presently implemented by virtual masking object (VMO) generation software running in a virtual simulation computer 210 (e.g., a personal workstation running two 266 MHz Pentium II processors). The processing flow of the VMO generation software is indicated in FIG. 20. Appendix A contains the listings of the key software routines implementing this processing flow for the reference apparatus.

The laser ranging data, formatted in the laser range data format (Table 5), are received by the virtual simulation computer 210 shown in FIG. 16 through a serial port, and are processed by a standard communications processing module 241 shown in FIG. 20. This module, and other standard modules normally available through various vendors, requiring only minimal customization within the capability of any programmer familiar with the C and C++languages and standard communications data processing, are outlined in dashed lines in FIG. 20 and are not listed in Appendix A.

The communications processing module 241 places the laser ranging data into a global memory buffer module 242. A global memory interface module 243 fetches the laser ranging data for each consecutive ranging sector for processing by the virtual blade object generation module 244. This module agglomerates adjacent ranging sectors on the same scan line into virtual blade objects, by implementing the rules for virtual blade object generation shown in Table 1. The processing generates an array of virtual blade objects, which are then processed by the virtual masking object (VMO) generation module 245, which implements the VMO generation rules of Table 1. The data arrays defining the border points of the VMOs are then read by the VMO VRML construct generation module 246, which assembles data strings describing the individual VMO. An example of VMO strings generated by this module is shown in FIG. 5. These VMO strings are passed by the VMO VRML construct generation module into the current virtual scene for VMO rendering 247. The current virtual scene includes the virtual entities generated by virtual entity simulation (107 in FIG. 2).

The image of the current virtual scene, together with the image of a control frame (see FIG. 21), jointly form the computer-generated image 248, that may be optionally displayed in Display B 211 in FIG. 16. The computer-generated image is transmitted to the video mixer 213 through the virtual display cable 212 (e.g., a VGA/SVGA computer display cable).

Figure 21:
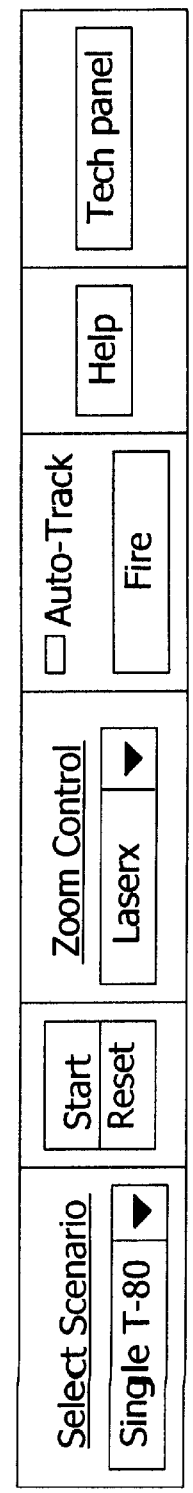
FIG. 21 is an example of the control frame in the computer-generated image.

The control frame shown in FIG. 21 is shown above the virtual scene in the computer-generated image. It is implemented by the Java and VRML-capable browser running the Java applet code for VMO VRML construct generation, and rendering the virtual scene, as indicated in the code listings of Appendix B.

Figure 22:
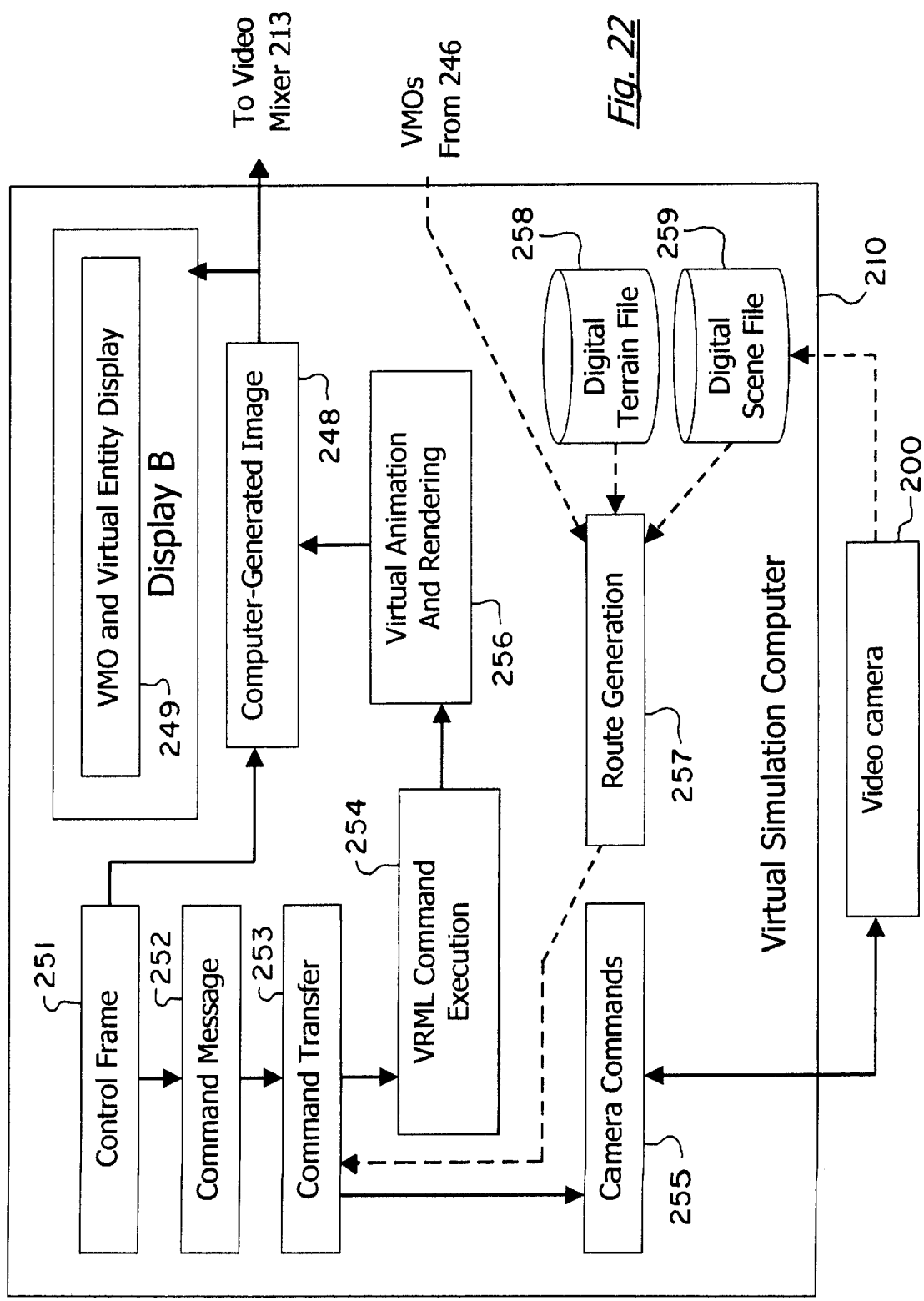
FIG. 22 is a simplified block diagram of the virtual simulation and control software.

Virtual entity simulation is implemented in the virtual simulation computer through the virtual simulation and control software. The processing flow of the virtual simulation and control software is shown in FIG. 22. Appendix A contains the listing of the key modules of the virtual simulation and control software.

The observer's command interface is implemented in the HTML control frame 251 (shown in detail in FIG. 21) through the various selection lists and control buttons. The observer's control actions result in the execution of Javascript command messages 252. The Help button in the control frame invokes a stand-alone, floating HTML help page, and the Tech Panel button invokes a separate control frame for adjusting Display B. These two controls are not relevant to the method disclosed, and their functions are not discussed further, except to remark that the Tech Panel controls implement boresighting of the virtual, video, and laser scenes. The Select Scenario list, and Start and Reset buttons in the control frame execute control functions related to the virtual simulation only. The code sequences resulting from activating these controls are listed in Appendix B. Select Scenario selects one of several available scenarios for the behavior of the virtual entities being simulated (in this case T-80 main battle tanks). Other scenarios not related to tanks, or military training, can be selected by a user of the reference apparatus after minor modification of the VRML data, and the labels of the scenario control list. The Start and Reset buttons start and reset a selected scenario.

The Zoom Control list box, the AutoTrack check box, and the Fire button in the control frame emulate some of the functions of the controls available to the gunner of a main battle tank, or to the gunner in a tank simulator, for engaging the virtual T-80s operated by the virtual simulation.

Activating any of the controls available in the control frame, a Javascript command message 252 is executed, which in turn, invokes the command transfer 253 functions in a Java applet. In the case of the Zoom Control, the command transfer function executes the code in a dynamic link library (DLL) for camera commands 255, and also a VRML script function for VRML command execution 254. The camera command functions ensure that the scene displayed by the video camera and the VRML-generated virtual scene are displayed at the same magnification. All other control objects in the control frame interact only with VRML command execution. The VRML command execution script functions, in turn, activate changes in the Virtual Animation and Rendering 256 elements implemented in VRML. The virtual animation and rendering function, in turn, renders and displays the virtual elements of the computer-generated image 248, which also contains the virtual masking objects.

The computer-generated image 248 may be optionally displayed in Display B 211 in FIG. 16. The computer-generated image is transmitted to the video mixer 213 through the virtual display cable 212 (e.g., a standard VGA/SVGA computer display cable). The virtual entities implemented by the virtual simulation and control software are capable of engaging the avatar of the observer's vehicle, depending on the scenario loaded in. In the reference apparatus, in which the observer's position is assumed to be static, the avatar of the observer's vehicle is implicitly located at the observer's VRML Viewpoint node coordinates. The VRML route nodes describing the motion of the virtual entities are generated automatically by a route generation 257 module (written in Visual Basic and Java). The route generation module is regarded as a support module of the visual simulation, generally implementing existing technology, and will be described separately.

Image combination is implemented through the video mixer 213 (in FIG. 16), a commercially available DeltaScan Pro GL GenLock unit. The S-video format analog video image of the real-world scene generated by the video camera is delivered to the video mixer by means of the video cable 201, a standard and commonly available S-video cable. The computer-generated image resulting from the virtual masking object generation and virtual simulation and control functions is a standard VGA or SVGA color image generated with 16-bit or 24-bit color pixels (depending on settings in the virtual simulation computer). This image is delivered to the video mixer through a standard, commonly available VGA/SVGA cable. The background color used in the reference apparatus is black (0,0,0 RGB values), with 0 intensity. The video image shows up as the background image, that is, in all areas of the computer-generated image rendered with these attributes. This results in the combined reality scene showing virtual entities in the real world, the objective of the invention.

The output of the video mixer is an S-video signal, available through the S-video feed cable 214 (in FIG. 16), a standard S-video cable. The available settings of the video camera and the video mixer also permit the use of a standard NTSC composite video signal, in which case the S-video compatible cables are replaced by a standard NTSC video cable. The display function of the combined reality scene in the reference apparatus is implemented through an S-video display.

The observer of the reference apparatus is at a static position, observing the combined reality scene through a simulated gunsight of a main battle tank. In the reference apparatus observer controls are those on the control panel (FIG. 21). A Global Positioning Satellite (GPS) receiver, with optional differential correction, and an aircraft altimeter determine the three-dimensional position of the observer. Alignment of the apparatus with the vertical in is assured through two bubble levels. The azimuth of the boresight axis is determined with the help of landmarks, a telescope attached to the laser scanner housing, and a calibrated compass azimuth ring. Observer action processing takes place through the software responding to control panel actions. Generation of geographical information and virtual entity movement and alignment information takes place through the use of a route generation module, operated in advance of using the apparatus.

The route generation module 257 is an inter-operating collection of software written in Visual Basic and Java. It supports the virtual simulation and control, and observer sate and action processing functions. It is a supporting module of the reference apparatus, which can be implemented without operating this module. Only the summary of the operation of the route generation module is described, on the basis of which an equivalent software module can be developed by a programmer familiar with its implementation languages, VRML, and the US Geological Survey Digital Elevation Model (USGS DEM). The VRML route nodes describing the motion of the virtual entities are generated automatically by the module. The terrain preparation component of the module reads in USGS DEM digital terrain files 258 that include the observer's location, and generates a VRML elevation grid from the USGS DEM data. The route builder component of the module automatically prepares three-dimensional VRML position and orientation interpolator nodes for the scenario from the VRML elevation grid and routes overlaid on a map display by the observer. These nodes are read at simulation start time by a Java command transfer function, which injects them into the VRML content of the virtual simulation (implemented through the VRML command execution, and virtual animation and rendering functions).

The VRML elevation grid derived from the USGS DEM data usually does not correspond exactly to the terrain visible through the video camera 200 (FIG. 16), or sensed by the laser scanner 203. To correct the VRML elevation grids on the basis of real-world data, the Virtual Masking Objects (VMOs) built by the VMO VRML construct generation module 246 (in FIG. 20), and digital scene files 259 can be read by the correction component of the route generation module. The digital scene files are video snapshots received from the video camera and saved as standard JPEG or BMP files. Alternatively, during scenario preparation, before a scenario is executed by the virtual simulation and control software, the direct video feed from the video camera can be used to edit the VRML terrain grid. In this editing mode, the virtual image of the terrain grid, displayed by the Java component of the route generation module, is mixed, through the video mixer 213 with the video image of the corresponding terrain in the S-Video display 215. The controls of the route generation software in this case permit the direct manipulation of each point on the terrain grid.

Implementation Alternative

The range of the ranging sectors within the field of regard of a range scanning device may be determined by other means besides laser scanner devices as described for the reference apparatus. As a design guideline for optical or electromagnetic ranging, such as microwave ranging, the angular extent of the ranging sectors in radians is limited by the ratio of wavelength to transmitter aperture (reflector, antenna, or lens). This limitation also applies to acoustic ranging. A practical scanner alternative to a laser is the use of currently emerging 77 GHz automobile collision avoidance radars, as well as other millimeter-wave radar devices.

Embodiments of the invention using step-by-step range scanning methods, advancing from ranging sector to ranging sector, such as shown in the diagram of FIG. 19, require a minimum frame scan time of t=2nr/c, where n is the number of ranging sectors in a scan frame, c is the speed of light for electromagnetic scanning and the speed of sound for sonic scanning, and r is the maximum range of the scanning instrument. When t is greater than approximately 0.03 seconds, the virtual masking object time processing extrapolation methods, such as shown in FIG. 8, must be invoked for dynamic real-world scenes. The relationship r=0.015c/n will determine the maximum range for a given scanning frame size without applying virtual masking object extrapolation. For ranging sectors corresponding to the pixels of a VGA display, n=288,000, limiting the value of r to 15.6 meters with electromagnetic scanning. These relationships also mean that sonic scanning of dynamic scenes, in essence, will always require the use of extrapolation algorithms. The limiting factor in the case of sonic scanning in dynamic scenes is the scan frame repetition rate. Estimating the minimum acceptable ranging sector size as approximately 1 degree in azimuth and elevation, the scan frame repetition rate is approximately 0.5 Hz at a 4-meter range. Scan frame repetition rates below this value are unlikely to provide adequate information for realistic extrapolation.

Step-by-step ranging using electromagnetic scanning can provide high-resolution virtual masking for longer ranges without extrapolation when the optical axis of the range scanner is coupled to a sensor tracking the foveal motion of the observer. Such sensors are available in experimental and military systems. The foveal zone is less than 3 degrees in angular extent. It is the only zone within which fine details are observed by the human eye. Considering a one milliradian ranging sector, foveal motion-coupled optical or electromagnetic range scanning can be performed without the need for extrapolation up to a range of approximately 1700 meters. A second scanner, operating at a different wavelength, may then cover the whole visual field at the same range without the need for extrapolation with ranging sectors of approximately 1 degree of angular extent.

Figure 23:
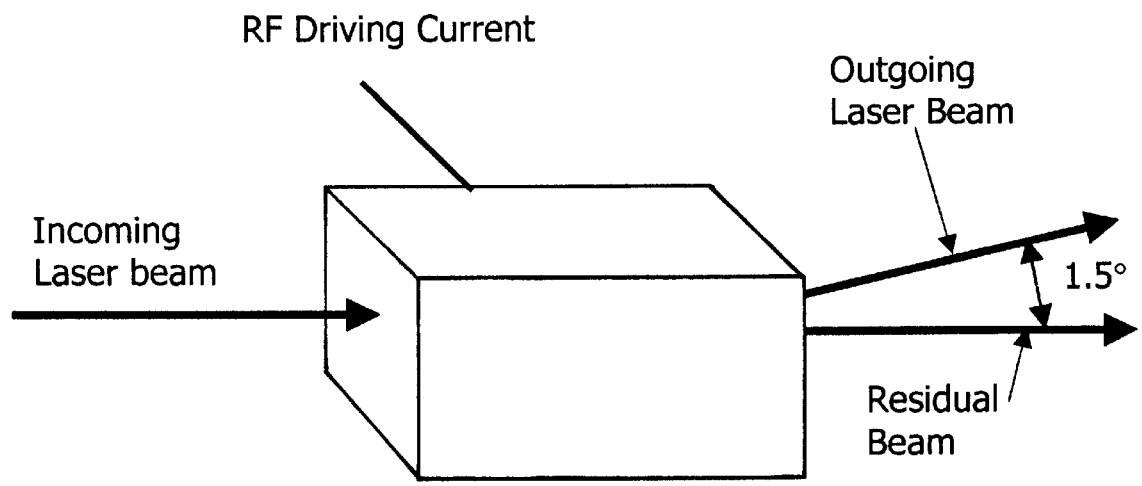
FIG. 23 is a diagram demonstrating how an input laser beam can be steered using a crystal excited by an alternating electrical field.

High frame rate sequential scanning requires high-frequency beam steering methods. Using a two-mirror arrangement similar to that of FIG. 17, and with the ranging sector and field of regard of the reference apparatus, the required horizontal mirror rotation frequency is approximately 100 Hz. This can be achieved by mechanical means. Considerably higher frequencies can be achieved by laser-transparent crystals excited by alternating electrical fields (FIG. 23). Beam deflection amplitude by this method is limited approximately to±1.5 degrees. The limited scan angles of the various high-frequency beam steering methods can be multiplied by reflecting mirrors, each mirror multiplying the angle by a factor of two.

Active flash ranging methods are based on illuminating a scene simultaneously with ranging pulses covering the whole field of view of interest, and receiving the return reflection through a lens system directing the reflection to a CCD sensor matrix device. The practical embodiment of laser ranging devices built using this method used additional range discrimination besides return time discrimination, such as multiple amplitude-modulated ranging flash pulses, or frequency-modulated ranging flash pulses. Flash ranging permits the generation of virtual masking objects without extrapolation. The limitation of this method is in its large power requirement for large fields of regard, which, in turn, limits its practical range to around 100 meters.

Figure 24:
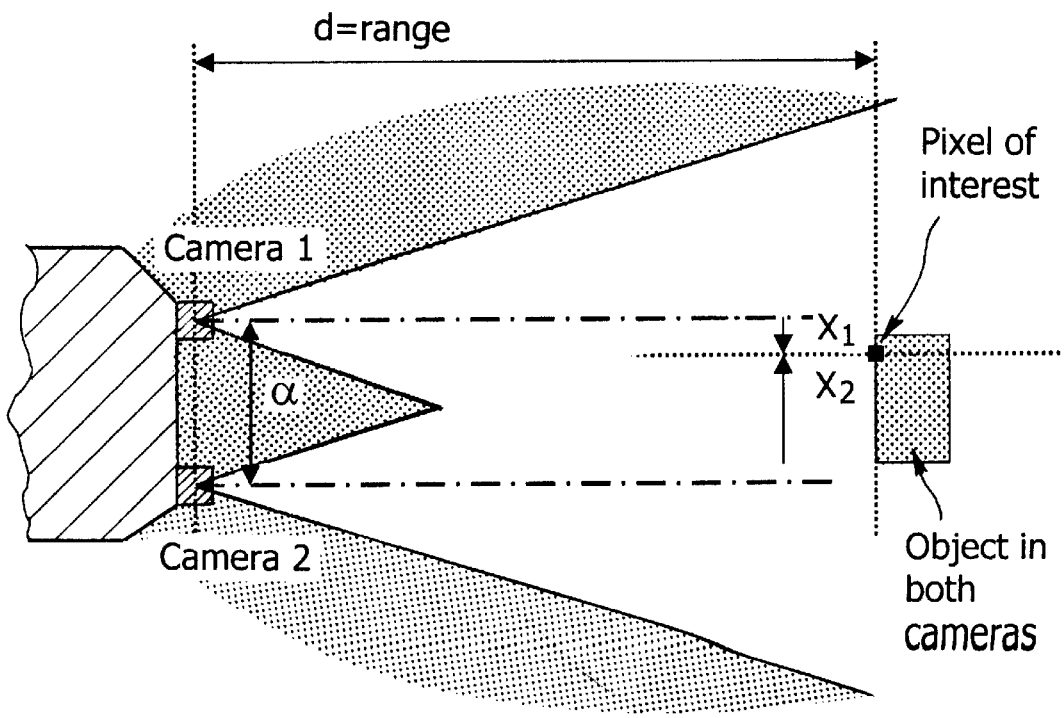
FIG. 24 is a diagram illustrating passive optical ranging using two cameras to determine the range of an object.

Passive ranging methods are based on parallax measurements of ranging sectors (pixels) in coaxial CCD matrix cameras with parallel optical axes separated by a known baseline (FIG. 24). The identification of ranging sectors may take place by comparison of individual pixel color and intensity values, or by identifying each pixel through its return reflection of a laser scanning beam through a hybrid passive-active ranging approach. In terms of the notation of FIG. 24, the range d from the passive range measurement device is $d=a/(\tan X1 - \tan X2)$, or for $d>>a$, $d=a/(X1-X2)$ where X1 and X2 are the apparent angular increments of the pixel of interest from the optical axes of Camera 1, and Camera 2, respectively. The method is compatible with high-speed, parallel hardware level processing.

Most of the examples discussed in the disclosure are in the area of military training, enabling individuals or combat vehicle crews to engage simulated opponents in a real-world environment. The invention is not limited to such applications; it can be applied with equal efficacy to inserting virtual elements into films in an automated manner, displaying the appearance of potential construction in its planned exterior or interior site, or as an interactive, recreational device. It can be used as an interior decorating or arrangement planning and demonstration aid, or as an aid showing the potential effects of reconstructive surgery or dental work. The method disclosed is capable of supporting such applications, or other implementations in which virtual, computer-generated scenes must appear to fit seamlessly into a real-world environment.

The above disclosure sets forth a number of embodiments of the present invention. Other arrangements or embodiments, not precisely set forth, could be practiced under the teachings of the present invention and as set forth in the following claims.

TABLE 1

Example of rules to generate virtual masking objects

| Function | Condition |
| --- | --- |
| Define zero, one, or more coherent virtual objects within each scan line, having an angular height of one ranging sector (objects referred to as virtual blade objects). | Add new ranging sectors to the current virtual blade object as long as the individual ranging sectors fall on a straight line within tolerance "d0" (for example, 1% of the range, and no less than the scanner's ranging error) as computed by a least-squared error algorithm. |
| Identify the virtual blade objects that belong to a common virtual masking object. | Add new virtual blade objects to a virtual masking object as long as the end points fall into a common plane within tolerance "d1" as computed by a least-squared error algorithm, and the virtual blade objects added are adjacent virtual blade objects already within the virtual masking object. |
| Filter the edges of virtual masking objects to remove unnecessary vertices. | Build straight line edges for the virtual masking objects, remove intermediate vertices which fall on a straight line edge within tolerance "d2" as computed by a least-squared error algorithm |
| Limit virtual masking object size to that appropriate for fast rendering. | Limit virtual masking objects to "n" (for example, 50 or 100) vertices. |
| Remove holes from virtual masking objects. | Fill in spaces of one ranging sector between adjacent virtual blade objects if the virtual blade objects otherwise fall into a common plane. |

TABLE 2

Time processing algorithm invocation logic

| Function or Action | Condition to Invoke Function or Action |
| --- | --- |
| Do not activate time processing | Observation point is static and there are no moving real-world entities in the scene |
| Decide to compute time processing frequency for the extrapolation of vertices of virtual masking objects. | When movement of vertex is larger than a predefined minimum number of ranging sectors during the previous frame update, compute time processing frequency as number of ranging sectors swept by the vertex during previous frame update. Frequency is limited by maximum desired update rate (e.g. 30 Hz). |
| Decision to re-render a virtual masking object | If one or more vertices of virtual masking object are re-computed by time processing. |

TABLE 3

Examples of observer action processing

| Observer Actions | Effect of Observer Action | Implementation and Reference |
| --- | --- | --- |
| Tracking of Virtual Targets by selecting Autotrack button | Simulated gunsight reticle placed on target, reticle automatically follows target. | Autotrack software sequence in Appendix B. |
| Fire gun at virtual target | Engage target being auto-tracked | Engage software sequence in Appendix B. |
| Change gunsight magnification | Change simulated gunsight magnification | Zoom change software sequence in Appendix B. |
| Select, start, pause, stop scenario | Selects and controls a scenario in virtual simulation | Scenario control software sequence in Appendix B. |

TABLE 4

Laser Scanner Control Logic

| Scanner Action | Control Logic |
| --- | --- |
| Laser pulse fire | 266 Hz repetition rate |
| Increment horizontal scan angle (azimuth) | Follow laser pulse firing signal with sufficient time, as a minimum, for laser out-and return at maximum range. Precede laser signal with sufficient settle time for step motor-mirror subsystem |

TABLE 4-continued

Laser Scanner Control Logic

| Scanner Action | Control Logic |
|---|---|
| Terminate horizontal scan line | Respond to opto-mechanical interruptor |
| Increment vertical scan angle (elevation) | Follow termination of horizontal scan line |
| Initiate new horizontal scan line | Follow elevation increment, reverse horizontal scan direction |
| Terminate scan frame | After last horizontal scan line complete |
| Initiate new scan frame | After termination of frame, if new frame start command is received |

TABLE 5

Laser Data Format

| Data | Implementation |
|---|---|
| Serial Communication Parameters: | 14400 Baud, No parity, 8 bits, 1 stop bit |
| Start frame, upper left corner of scan frame | "BFU" |
| Start frame, lower right corner of scan frame | "BFD" |
| Range value scaling for frame starting now | "SC = x.xxx" |
| Start next scan line No. ddd | "SLddd" |
| End of current frame | "EF" |
| Range data following "SLddd" | Scaled binary range of two bytes for each measurement. Both bytes have a "Byte Indicator Bit" at the high bit: raised (1) for the high byte, low (0) for the low byte. |
| Positional values of range data bytes, providing a numerical range of 0–16383 | "Low" byte 64 32 16 8 4 2 1<br>"High" byte 8192 4096 2048 1024 512 256 128 |
| Application of Range Scaling Factor | Multiplier for the values transmitted by the range data bytes. |

TABLE 6

Correlation of the Method of Invention with the Reference Apparatus

| Step or Element of the Method of the Invention | References | Implementation in the Reference Apparatus | References |
|---|---|---|---|
| Range Scanning | 101 in FIG. 2 | Laser Scanner (203), Electronics Unit, | FIGS. 16, 17, 18 and 19, Tables 4 and 5 |
| Video Camera | 102 in FIG. 2 | Video Camera (200) | FIG. 16 |
| Virtual Masking Object Generation | 105 in FIG. 2, FIGS. 3–9, Tables 1–2 | Virtual Masking Object Generation Software in Virtual Simulation Computer | Appendix A, 210 in FIG. 16, FIG. 20 |
| Virtual Entity Simulation | 107 in FIG. 2 | Virtual Entity Simulation and Control Software | FIGS. 21–22 |
| Virtual Image Generation | 109 in FIG. 2 | Virtual Reality Modeling Language, VRML Script | FIG. 22 (254, 256) |
| Image Combination | 110 in FIG. 2, FIGS. 10–15 | DeltaScan Pro | FIG. 16 (213) |
| Display | 111 in FIG. 2 | S-Video Display | FIG. 16 (215) |
| Observer's Sensors and Controls | 115 in FIG. 2 | Control Frame, Global Positioning Satellite rcvr. | FIG. 21 |
| Observer State and Action Processing | 116 in FIG. 2, Table 3 | Virtual Entity Simulation and Control Software | Appendix B |

TABLE 7

Glossary of Terms

| | |
|---|---|
| avatar | A virtual image and supporting virtual object data and programs representing a real-world entity in virtual reality |
| combined reality, combined reality scene | Apparent reality, with virtual elements projected into the image of the real world. Virtual and live elements may interact through simulation. |
| live original | An entity in the real world, represented by an avatar. |
| masked virtual image | That portion of a virtual image which would be visible from a given |

TABLE 7-continued

Glossary of Terms

| | |
|---|---|
| | observation point if the virtual image represented a real-world entity. |
| range frame rate | The update rate of a range map |
| range map | Array of the ranging sector ranges measured in a field of regard |
| ranging sector | An angular space within which range to an object is measured |
| real-time virtual image obscuration | Virtual image obscuration taking place at a fast enough rate (usually 25 to 30 display frames per second) to present apparent continuous motion and obscuration of virtual entities by real-world objects. |
| real-world entity | An actual object, living being, or phenomenon |
| real-world coordinates | A coordinate system for referencing real-world entities |
| real-world scene | The set of real-world entities which may be observed by, interacting with, or used by the user of the invention |
| state vector | The three-dimensional position, orientation, velocity, and other descriptors of the current state of a virtual or real-world entity |
| virtual coordinates | A coordinate system in which a simulation represents virtual entities. In combined reality is coincident with the real-world coordinates. |
| virtual entity | An object, living being, or phenomenon represented by simulation |
| virtual image | The image of a virtual entity |
| virtual-live interaction | The interaction of virtual entities with real-world entities |
| virtual masking object | A virtual object implementing the obscuration of objects caused by a real-world entity, or by a part of a real-world entity, as seen from the current point of view of an observer. |
| virtual position | Location in the real world where a virtual entity is represented |
| virtual reality | An artificial world, created in a digital computer, in which various virtual entities seem to exist, operate, and interact with each other. |

We claim:

1. A system for combining virtual images with a real-world scene within a field of interest for an observer, said system comprising:
   a range scanner scanning the field of interest and generating range data indicating the distance of real-world objects within the field of interest;
   a computer model simulating a virtual entity and producing a virtual image of said virtual entity at a location within the field of interest;
   means for generating masked virtual objects from said range data and said virtual image indicating those portions of said virtual image that are visible in the field of interest;
   means for combining said masked virtual objects and a real-world image of the field of interest to create a combined image in which said virtual image appears in the real-world image; and
   display means for displaying said combined image to the observer.

2. The system of claim 1 wherein said display means comprises the imaging system of an armored vehicle and wherein the field of view comprises the field of view through said imaging system.

3. The system of claim 1 wherein said display means comprises the display of an aircraft simulator and wherein the field of view comprises the field of view from the cockpit of a simulated aircraft.

4. The system of claim 1 wherein said display means comprises an electronically-controlled visor and wherein the field of view comprises the field of view visible through said visor.

5. The system of claim 1 wherein said display means comprises the display system of a computing device and wherein the field of view comprises the field of view of a video camera transmitting images to said computing device.

6. The system of claim 1 further comprising means for generating virtual masking objects from said range data corresponding to real-world objects within the field of interest, and wherein said means for generating masked virtual objects combines said virtual masking objects with said virtual image to determine those portions of said virtual image that are visible in the field of interest.

7. The system of claim 6 wherein said virtual masking objects, said virtual images, and said masked virtual objects are defined in virtual reality modeling language (VRML).

8. The system of claim 1 further comprising control means for enabling the observer to change the field of view.

9. The system of claim 1 further comprising means for enabling the observer to interact with said computer model simulation and said virtual image.

10. The system of claim 1 wherein said range scanner periodically scans an array of ranging sectors in the field of view.

11. The system of claim 10 further comprising means for extrapolating changes in said masked virtual objects between said periodic scans.

12. A method for combining virtual images with a real-world scene within a field of interest for an observer, said method comprising:
   scanning the field of interest to generate range data indicating the distance of real-world objects within the field of interest;
   simulating a virtual entity to produce a virtual image of said virtual entity at a location within the field of interest;
   generating masked virtual objects from said range data and said virtual image indicating those portions of said virtual image that are visible in the field of interest;
   combining said masked virtual objects and a real-world image of the field of interest to create a combined image in which said virtual image appears in the real-world image; and
   displaying said combined image to the observer.

13. The method of claim 12 wherein said combined image is displayed through the imaging system of an armored vehicle and wherein the field of view comprises the field of view through said imaging system.

14. The method of claim 12 wherein said combined image is displayed through the display of an aircraft simulator and wherein the field of view comprises the field of view from the cockpit of a simulated aircraft.

15. The method of claim 12 wherein said combined image is displayed through an electronically-controlled visor and wherein the field of view comprises the field of view visible through said visor.

16. The method of claim 12 wherein said combined image is displayed through the display of a computing device and wherein the field of view comprises the field of view of a video camera transmitting images to said computing device.

17. The method of claim 12 wherein said combined image is injected into the optical train of an optical instrument.

18. The method of claim 12 further comprising generating virtual masking objects from said range data corresponding to real-world objects within the field of interest, and wherein said step of generating masked virtual objects combines said virtual masking objects with said virtual image to determine those portions of said virtual image that are visible in the field of interest.

19. The method of claim 18 wherein said virtual masking objects, said virtual images, and said masked virtual objects are defined in virtual reality modeling language (VRML).

20. The method of claim 12 further comprising providing controls to enable the observer to change the field of view.

21. The method of claim 12 further comprising providing controls to enable the observer to interact with said simulation of said virtual entity.

22. The method of claim 12 wherein said step of scanning comprises periodically scanning an array of ranging sectors in the field of view.

23. The method of claim 22 further comprising extrapolating changes in said masked virtual objects between said periodic scans.

24. A method for combining virtual images with a real-world scene within a field of interest for an observer, said method comprising:

scanning the field of interest to generate range data for a two-dimensional array of range sectors indicating the distance of real-world objects within the field of interest;

generating virtual masking objects from said range data corresponding to real-world objects within the field of interest;

simulating a virtual entity to produce a virtual image of said virtual entity at a location within the field of interest;

combining said virtual image and said virtual masking objects to generate a masked virtual object indicating those portions of said virtual image that are visible in the field of interest;

combining said masked virtual objects and the real-world image of the field of interest to create a combined image in which said virtual image appears in the real-world image; and displaying said combined image to the observer.

25. The method of claim 24 wherein said virtual masking objects, said virtual images, and said masked virtual objects are defined in virtual reality modeling language (VRML).

26. The method of claim 24 further comprising providing controls to enable the observer to change the field of view.

27. The method of claim 24 further comprising providing controls to enable the observer to interact with said simulation of said virtual entity.

28. The method of claim 24 wherein said step of scanning comprises periodically scanning an array of ranging sectors in the field of view.

29. The method of claim 28 further comprising extrapolating changes in said virtual masking objects between said scans.

* * * * *